United States Patent
Yoshinuma

(10) Patent No.: US 10,882,339 B2
(45) Date of Patent: Jan. 5, 2021

(54) DRYER AND PRINTER

(71) Applicant: Toshihiro Yoshinuma, Kanagawa (JP)

(72) Inventor: Toshihiro Yoshinuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/712,615

(22) Filed: Dec. 12, 2019

(65) Prior Publication Data
US 2020/0207120 A1    Jul. 2, 2020

(30) Foreign Application Priority Data

Dec. 27, 2018 (JP) .................................. 2018-246205

(51) Int. Cl.
| | | |
|---|---|---|
| B41J 11/00 | (2006.01) | |
| B41F 23/04 | (2006.01) | |
| B41F 33/16 | (2006.01) | |
| B41J 2/175 | (2006.01) | |
| B01D 5/00 | (2006.01) | |

(52) U.S. Cl.
CPC ............. *B41J 11/002* (2013.01); *B01D 5/009* (2013.01); *B41F 23/0403* (2013.01); *B41F 33/16* (2013.01); *B41J 2/17596* (2013.01)

(58) Field of Classification Search
CPC .. B41J 11/002; B41J 2/17595; B41F 23/0403; B41F 33/16; B01D 5/009
See application file for complete search history.

(56) References Cited

U.S. PATENT DOCUMENTS

| | | |
|---|---|---|
| 9,908,342 B1 | 3/2018 | Boland et al. |
| 9,975,354 B1 | 5/2018 | Boland et al. |
| 2012/0001988 A1* | 1/2012 | Izawa ..................... B41J 2/175 347/85 |
| 2016/0101635 A1 | 4/2016 | Hoshino et al. |
| 2017/0153059 A1 | 6/2017 | Boland et al. |
| 2017/0266990 A1 | 9/2017 | Yoshinuma et al. |
| 2017/0266991 A1 | 9/2017 | Onodera et al. |
| 2017/0334217 A1 | 11/2017 | Yoshinuma et al. |
| 2018/0272715 A1* | 9/2018 | Fukunaga ............... B41J 29/02 |

FOREIGN PATENT DOCUMENTS

| | | |
|---|---|---|
| JP | 11-014258 | 1/1999 |
| JP | 11-105282 | 4/1999 |
| JP | 2008-094000 | 4/2008 |
| JP | 2010-201781 | 9/2010 |
| JP | 2012-153053 | 8/2012 |
| JP | 2016-078428 | 5/2016 |
| JP | 2017-207250 | 11/2017 |
| JP | 2018-066552 | 4/2018 |

* cited by examiner

*Primary Examiner* — Sharon Polk
(74) *Attorney, Agent, or Firm* — Duft & Bornsen, PC

(57) ABSTRACT

A dryer includes a heater configured to heat an object to dry the object, a plurality of collection devices configured to collect a liquid generated by liquefication of condensed vapor in the dryer, a drainage tube configured to drain the liquid from each of the plurality of collection devices, a pump configured to feed the liquid through the drainage tube, a switch configured to switch a connection between the plurality of collection devices and the switch, and a pressure sensor configured to measure a pressure between the switch and the pump.

8 Claims, 20 Drawing Sheets

DRYER AND PRINTER

CROSS-REFERENCE TO RELATED APPLICATION

This patent application is based on and claims priority pursuant to 35 U.S.C. § 119(a) to Japanese Patent Application No. 2018-246205, filed on Dec. 27, 2018 in the Japan Patent Office, the entire disclosure of which is hereby incorporated by reference herein.

BACKGROUND

Technical Field

Aspects of the present disclosure relate to a dryer and a printer.

Related Art

A dryer includes an exhaust mechanism or a waste-liquid collection mechanism. The exhaust mechanism exhausts air containing vaporized liquid outside an apparatus (dryer). The waste-liquid collection mechanism discharges the air that is condensed and liquefied inside the apparatus as a waste liquid. As an example of the dryer, there is a dryer including a waste-liquid collection mechanism that includes a radiation fin inside the dryer. The radiation fin condenses and liquefy vapor in the dryer into the waste liquid. The waste-liquid collection mechanism includes a collection pan to receive the waste liquid and a tank to collect the waste liquid received by the collection pan.

SUMMARY

In an aspect of this disclosure, a dryer is provided that includes a heater configured to heat an object to dry the object, a plurality of collection devices configured to collect a liquid generated by liquefication of condensed vapor in the dryer, a drainage tube configured to drain the liquid from each of the plurality of collection devices, a pump configured to feed the liquid through the drainage tube, a switch configured to switch a connection between the plurality of collection devices and the switch, and a pressure sensor configured to measure a pressure between the switch and the pump.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
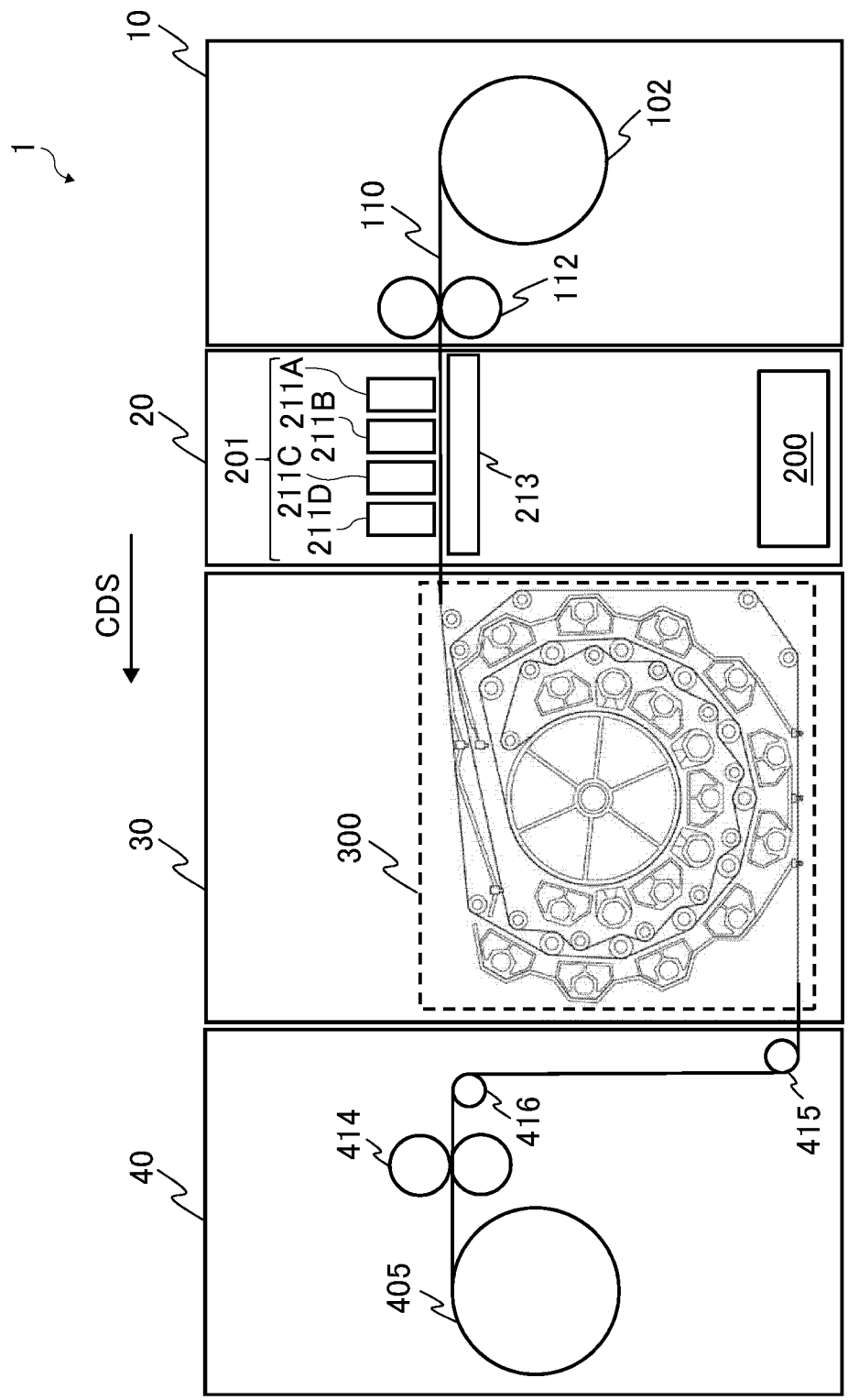
FIG. 1 is a schematic cross-sectional side view of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a", "an", and "the" are intended to include the plural forms as well, unless the context clearly indicates otherwise.

Embodiment of Printer

The dryer according to an embodiment of the present disclosure is applicable to an apparatus that needs to dry a liquid. A printer is an example of an apparatus to which the dryer according to the present embodiment is applicable. First, an embodiment of the printer according to the present disclosure is described below. FIG. 1 is a cross-sectional side view of a configuration of a print system 1 as an embodiment of the printer.

As illustrated in FIG. 1, the print system 1 includes a combination of a sheet supply device 10, an inkjet printer 20 as a liquid application unit, a dryer 30, and a sheet winding device 40.

The sheet supply device 10 is an apparatus that supplies a sheet 110. The sheet 110 is a continuous-form recording medium as an embodiment of an object to be dried. The inkjet printer 20 applies a liquid on the sheet 110 (object to be dried), and the sheet 110 (object to be dried) is conveyed to the dryer 30. The sheet supply device 10 includes a root winding roller 102 that holds a sheet 110 and conveyance rollers 112.

The inkjet printer 20 is a device that conveys the sheet 110 to the image forming unit 201 that discharges a liquid ink onto the sheet 110 to form an image on the sheet 110 and conveys, to the dryer 30, the sheet 110 onto which the image is formed. The sheet winding device 40 is a device that winds and collects the sheet 110 onto which an image has been formed and dried by the dryer 30. The inkjet printer 20 includes a controller 200. The controller 200 controls an operation of a configuration in the inkjet printer 20. The controller 200 may control the operation of the dryer 30 described below.

The inkjet printer 20 includes an image forming unit 201 including a liquid discharge head that discharges and applies ink, which is a liquid of a desired color, onto the sheet 110 conveyed from the sheet supply device 10.

The image forming unit 201 includes, for example, full-line liquid discharge heads 211A, 211B, 211C, and 211D for four colors arranged from an upstream in a conveyance direction of the sheet 110 as indicated by arrow "CDS" in FIG. 1. Hereinafter, the "liquid discharge head" is simply referred to as the "head". The heads 211A, 211B, 211C, and 211D applies a liquid of black (K), cyan (C), magenta (M), and yellow (Y) to the sheet 110, respectively. Note that the number and types of color are not limited to the above-described four colors of K, C, M, and Y and may be any other suitable number and types.

The root winding roller 102 in the sheet supply device 10 feeds the sheet 110 to the inkjet printer 20. Then, the conveyance rollers 112 in the sheet supply device 10 feeds the sheet 110 onto a conveyance guide 213 facing the image forming unit 201. The conveyance guide 213 guides and conveys the sheet 110 in the inkjet printer 20.

The sheet 110 onto which the liquid is applied by the image forming unit 201 is guided by the guide rollers 415 and 416 through the dryer 30 as an embodiment of the dryer according to the present disclosure. The sheet winding device 40 includes ejection rollers 414 and a winding roller 405. The ejection rollers 414 sends the sheet 110 to the winding roller 405, and the winding roller 405 winds the sheet 110 around the winding roller 405.

[Configuration of Dryer 30]

Next, a structure of a drying unit 300 in the dryer 30 as an embodiment of the dryer according to the present disclosure is described with reference to FIG. 2. The dryer 30 is a device that dries a liquid such as a treatment liquid or liquid ink adhered onto the sheet 110. The dryer 30 applies thermal energy such as electric heat, infrared rays, and hot air to the liquid on the sheet 110 to vaporize moisture on the sheet 110. Therefore, vapors such as vaporized treatment liquid and vaporized liquid ink may be generated inside the dryer 30. The generated vapor may be condensed inside the dryer 30 and liquefied to become a liquid. The liquid generated by condensation becomes a "waste liquid". When such waste liquid adheres to the sheet 110, the image formed on the sheet 110 may be stained by the waste liquid. Thus, the dryer 30 discharges the waste liquid out of the dryer 30.

Particularly, the dryer 30 used in the print system 1 that performs printing at high speed is preferably capable of drying a large number of sheets 110 in a short time. In the dryer 30 used in the print system 1 for high speed printing, the amount of vapor generated by vaporization of the treatment liquid and liquid ink also increases. Thus, condensation of the vapor also occurs in many places in the dryer 30. Thus, the waste liquid is generated at various places in the dryer 30, and amount of waste liquid also increases. If the waste liquid cannot be normally collected, a large amount of waste liquid may be generated inside the dryer 30. Thus, it becomes highly possible that the waste liquid soils the sheet 110 or operation of the dryer 30 becomes unstable.

Thus, it is important for the dryer 30 according to the present embodiment to improve reliability of the collection of the waste liquid to prevent contamination of the sheet 110, to maintain quality of image formed on the sheet 110, and to ensure stable operation of the dryer 30.

The dryer 30 according to the present embodiment includes a waste-liquid collection device that can reliably collect waste liquid generated by condensation of vaporized treatment liquid from viewpoints of ensuring operational stability, preventing contamination of the sheet 110, and maintaining image quality.

Specifically, a waste-liquid collection device collects the waste liquid that is generated by condensation of the vaporized treatment liquid and the liquid ink. The waste-liquid collection device includes a collection device, a liquid feed device, and a switching device. The collection device includes a pan to collect and collect the waste liquid. The liquid feed device feeds the waste liquid to a tank from the collection device. The switching device switches connection between the liquid feed device and the plurality of collection device. Further, the dryer 30 includes a measurement device between a pump and a switching device. Thus, the dryer 30 can reliably check a state of the waste-liquid collection device collecting the waste liquid. The measurement device measures a pressure during a switching operation of the switching device.

Further, the dryer 30 according to the present embodiment can reliably check whether the liquid can be normally fed between the pump and the switching device at time of startup of the dryer 30 by a linkage between the switching device and the measurement device. Thus, the dryer 30 can reliably collect the waste liquid.

Figure 2:
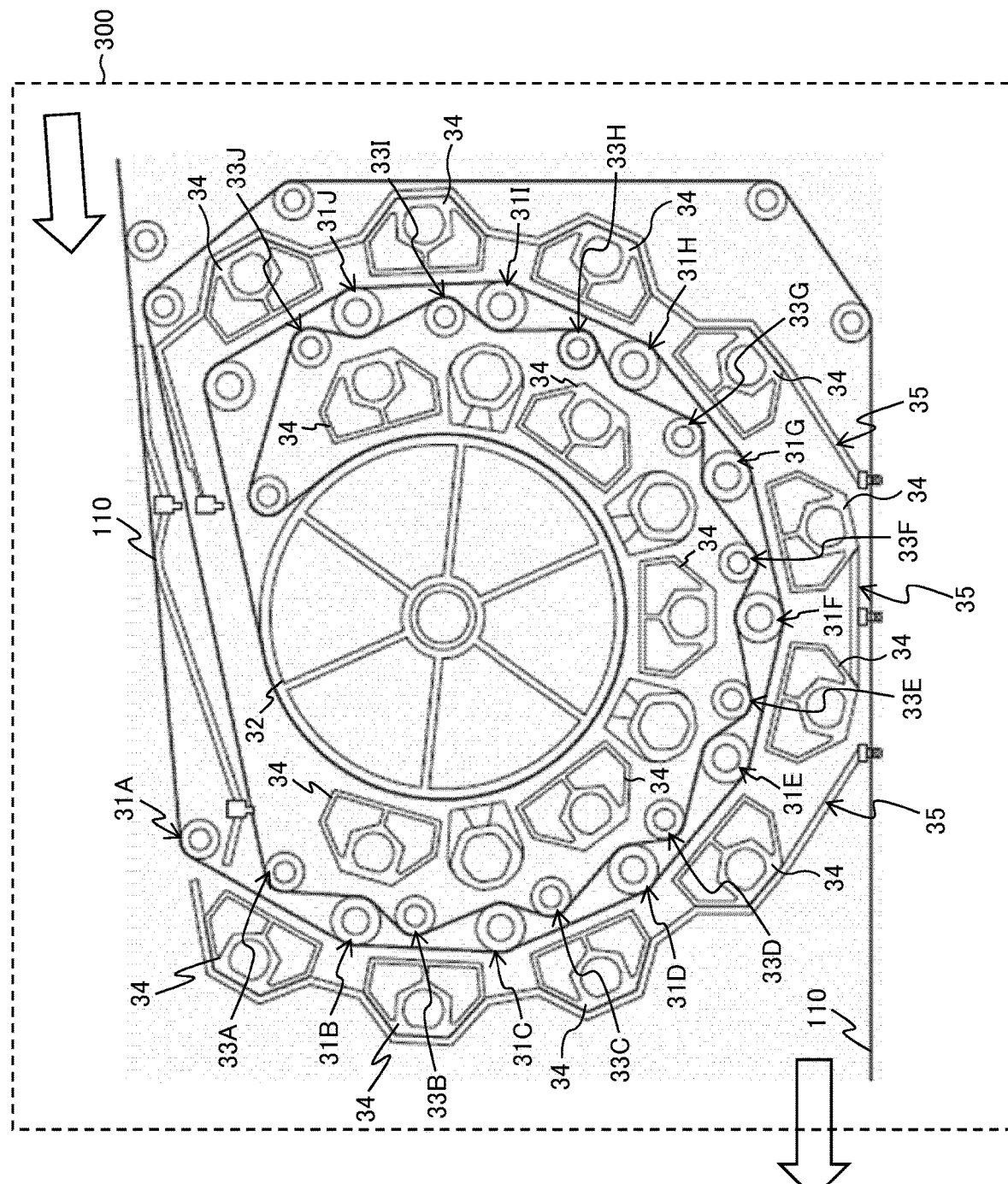
FIG. 2 is a schematic cross-sectional view of an inner structure of a dryer according to an embodiment of the present disclosure.

FIG. 2 is a cross-sectional side view of a front side of an internal configuration of the drying unit 300. The dryer 30 includes the drying unit 300 that dries the sheet 110 while conveying the sheet 110 that is an object to be dried in a direction indicated by white arrow in FIG. 2. The drying unit 300 includes heating rollers 31 (31A to 31J), a heating drum 32, and pressing rollers 33 (33A to 33J). The heating rollers 31 are ten numbers of heating members that contacts a back surface of the sheet 110 opposite to a front surface onto which the liquid applied to heat the sheet 110. The heating drum 32 contacts the back surface of the sheet 110 onto which the liquid is applied. The pressing rollers 33 (33A to 33J) presses the sheet 110 against the heating roller 31 (31A to 31J).

The heating rollers 31 and the heating drum 32 configure a "heater" to heat and dry the sheet 110 in the embodiment of the present disclosure.

The plurality of heating rollers 31 is arranged at predetermined intervals around the heating drum 32. The temperature of each of the heating roller 31 may be set at the same temperature, or may be individually set at an optimum temperature. For example, the set temperature may be increased in order from the heating roller 31 (heating roller 31A, for example) on an upstream side in the conveyance direction of the sheet 110.

Further, the set temperature of the heating roller 31 may not be higher than the set temperature of the heating drum 32. For example, if the temperature of the sheet 110 is rapidly increased, the sheet 110 may be rapidly contracted to cause wrinkles on the image forming surface of the sheet 110. Thus, the drying unit 300 adjusts and sets the temperature of the heating rollers 31 to be increased stepwise in the conveyance direction of the sheet 110 so that the temperature of the sheet 110 is increased stepwise to prevent contraction of the sheet 110. Note that the temperature relationship between the heating rollers 31 and the heating drum 32 is not limited to the temperature relationship as described above.

The temperature set to the heating rollers 31 and the heating drum 32 may be set to optimal temperature according to a material of the sheet 110, a type of image forming member (liquid ink), and a characteristic of the treatment liquid applied onto the image forming surface of the sheet 110. Therefore, the dryer 30 may include a configuration that can set an optimum temperature relationship between the heating rollers 31 and the heating drum 32 according to the object to be dried (sheet 110).

The heating roller 31 and the heating drum 32 of the dryer 30 applies thermal energy such as electric heat, infrared rays, and hot air to the liquid on the sheet 110 to vaporize the liquid on the sheet 110. The thermal energy applied by the heating roller 31 and the heating drum 32 vaporizes moisture in the treatment liquid and liquid ink adhered to an image forming surface of the sheet 110 to vapor.

The drying unit 300 of the dryer 30 includes a plurality of air blowers 34 that blows air onto a surface (front surface) of the sheet 110 opposite to the surface (back surface) heated by the heating rollers 31 and the heating drum 32. The air blowers 34 are devices to blow off vapor generated by heating the sheet 110 with the heating rollers 31 and the heating drum 32. Note that the air blown from the air blower 34 onto the sheet 110 is air in the dryer 30 or outside air. Thus, the air blown from the air blower 34 does not have to be heated air. Further, the air blower 34 is connected to an exhaust duct 362 (see FIG. 10) as described below. The air blower 34 also includes a configuration that blows air onto the sheet 110 and intakes and exhausts the air containing vapor around the sheet 110.

Some of the vapor blown off by the air blower 34 may not be exhausted outside the dryer 30 by the exhaust structure, and the vapor may float inside the dryer 30. The vapor float inside the dryer 30 is condensed on a wall arranged inside the dryer 30. Further, the vapor, which is in middle of exhausted outside the dryer 30 by the air blower 34, condenses inside the dryer 30.

Particularly, the air blower 34 is disposed in a vicinity of the heating rollers 31 or the heating drum 32 as a heat source. Since a temperature of an exterior of the air blower 34 is lower than a temperature of the heating rollers 31 and the heating drum 32, condensation of the vapor easily occurs. If condensation of the vapor occurs on the exterior of the air blower 34, the condensed vapor accumulates and liquefies to become a liquid and drops onto the sheet 110 or inside the dryer 30. The liquid dropped from the exterior of the air blower 34 becomes a waste liquid. The drying unit 300 includes a waste-liquid collection plate 35 around the air blower 34.

The waste-liquid collection plate 35 collects the waste liquid so that the waste liquid does not drops onto the sheet 110 or interior of the drying unit 300. The waste-liquid collection plate 35 is a part of the waste-liquid collection device in the dryer 30 according to the present embodiment. The drying unit 300 includes a plurality of the waste-liquid collection plates 35 in the dryer 30. The plurality of the waste-liquid collection plates 35 is arranged below each of the air blowers 34 in a gravity direction to prevent the waste liquids (liquefied vapor) to be dropped from the air blower 34 onto the sheet 110 and the interior of the drying unit 300. Details of the waste-liquid collection plate 35 is described below.

Further, condensation occurs also in the exhaust channel in the air blower 34 in the drying unit 300. To collect the waste liquid generated by condensation in an exhaust channel in the air blower 34, the drying unit 300 includes a tube joint at a position of collecting the waste liquid in the exhaust channel of the air blower 34. The tube joint configures a waste-liquid collection port to connect the waste-liquid channel. A tube for waste liquid is connected to the tube joint. The waste-liquid collection device includes the tube joint and tubes.

Further, the drying unit 300 includes an exhaust duct 362 (see FIG. 10) on a back side of the air blower 34 to exhaust air (including vapor) in the dryer 30. Condensation also occurs in the exhaust duct 362. As described below in detail, arranging the tube joint as a waste-liquid collection port in a part of the exhaust duct 362 can collect the waste liquid generated by the condensation of the vapor in the exhaust duct 362.

[Configuration of Air Blower 34]

Figure 3:
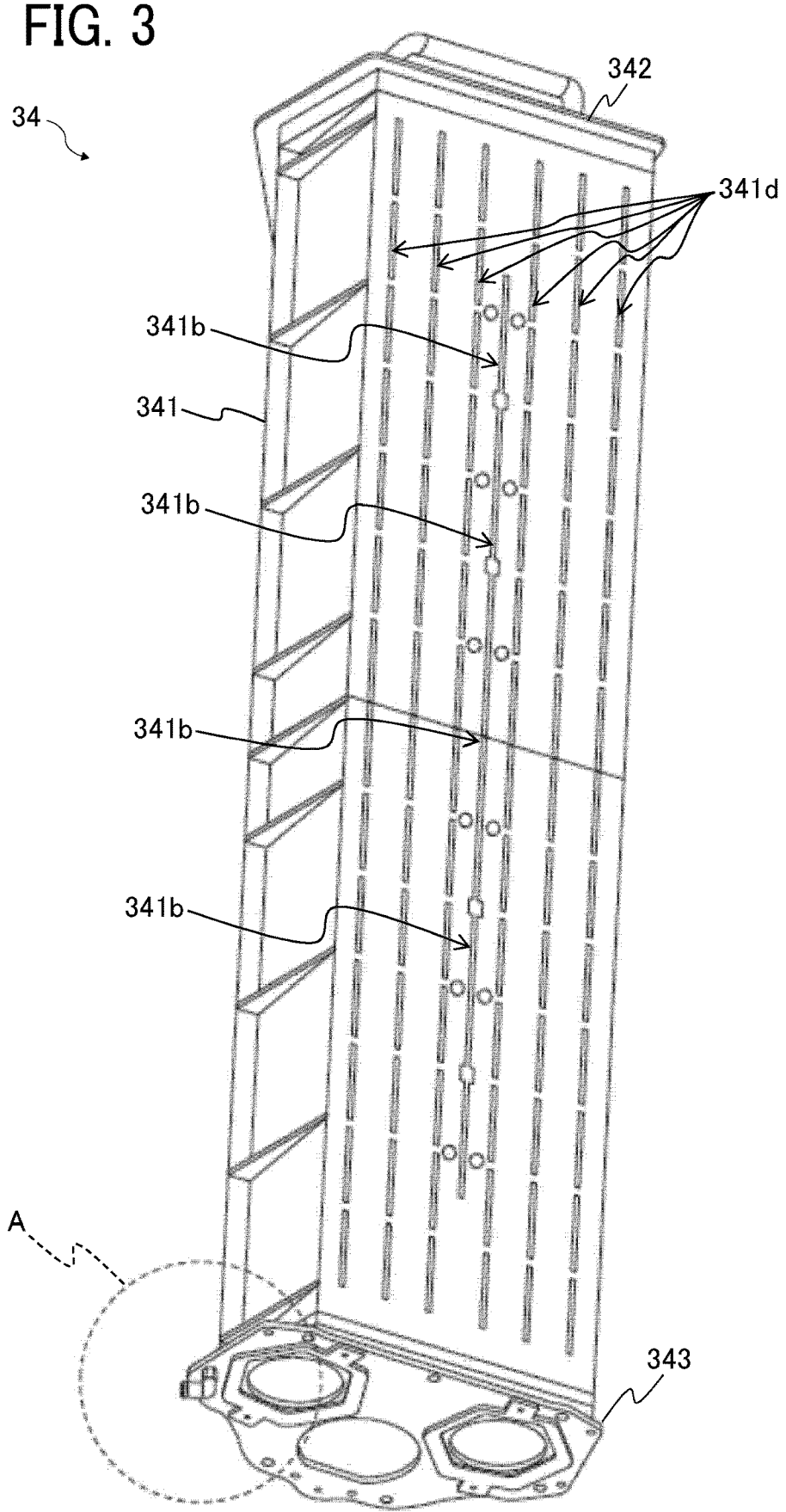
FIG. 3 is a perspective view of an example of an air blower in the dryer.
Figure 4:
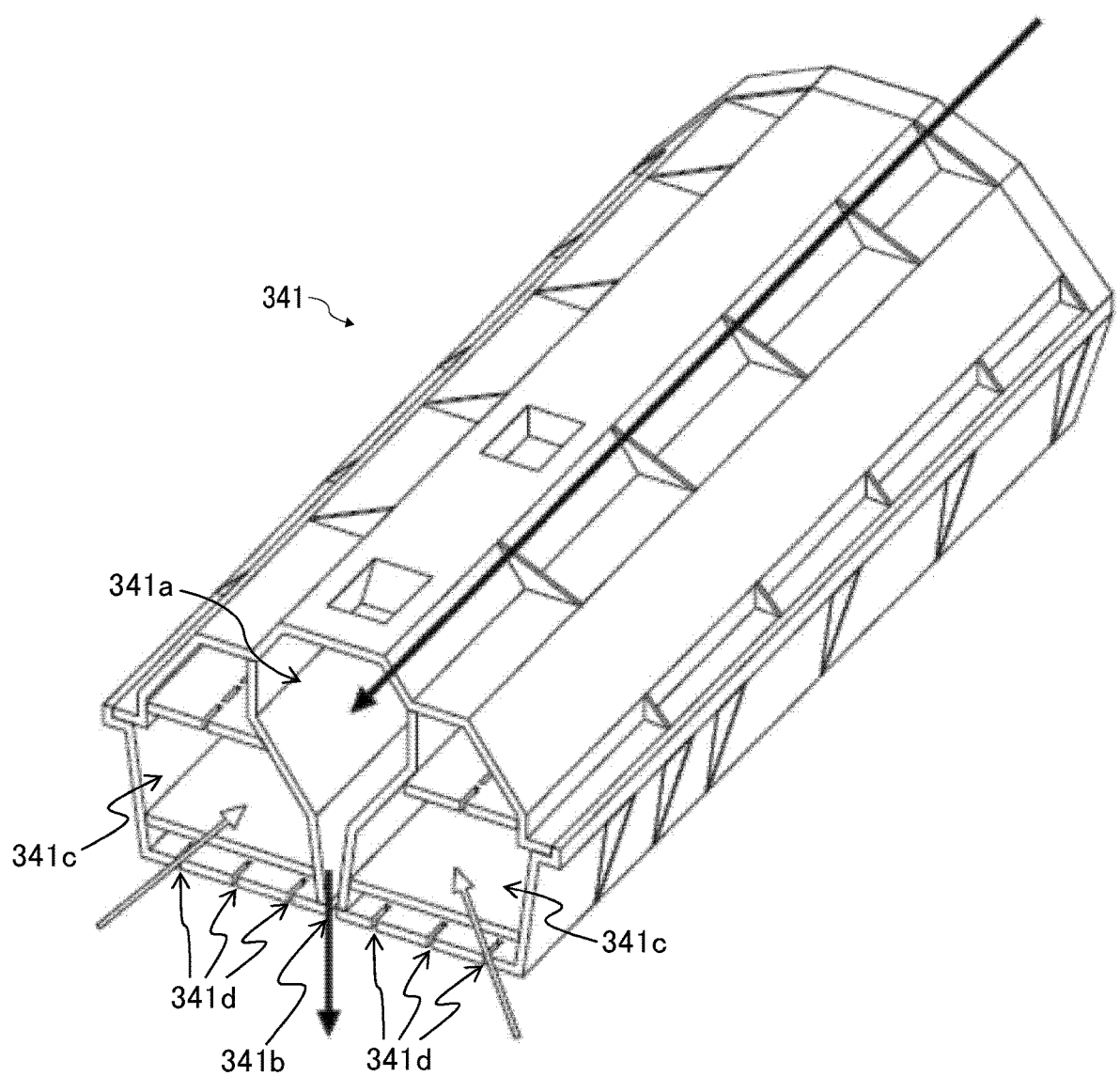
FIG. 4 is a perspective view of a cross-sectional shape of the air blower.

Next, a detailed structure of the air blower 34 in the drying unit 300 is described with reference to FIGS. 3 and 4. FIG. 3 is a perspective view of a surface of the air blower 34 facing the sheet 110 viewed from the exhaust side (back side) of the air blower 34. FIG. 4 is a perspective view of an air channel part 341 cut in a longitudinal direction of the air channel part 341 viewed from a front side-plate 342 (see FIG. 3). The front side-plate 342 and the rear side-plate 343 are illustrated in FIG. 3.

As illustrated in FIG. 3, the air blower 34 mainly includes the air channel part 341, a front side-plate 342, and a rear side-plate 343. A waste-liquid collection port as described below is arranged in a portion "A" of the rear side-plate 343 surrounded by a dotted circle.

As illustrated in FIG. 4, the air channel part 341 is a long member having a substantially trapezoidal cross-sectional shape. The air channel part 341 includes a cavity that is roughly divided into three parts. The air channel part 341 includes air intake ports 341d that are openings to intake gas containing vapor from the sheet 110 (see FIG. 3). Further, a blower slit 341b to blow air to the sheet 110 is formed in the air channel part 341. Three cavities are formed in the air channel part 341.

One cavity is an air supply channel 341a formed at the center of the air channel part 341. Two cavities are exhaust channels 341c formed at both ends of the air channel part 341. Arrows in bold face type in FIG. 4 indicate an example of an airflow took from outside air and blown onto the sheet 110. Thus, the outside air is taken in from the rear end side of the air channel part 341 and is blown toward the sheet 110 from the blower slit 341b formed between the two exhaust channels 341c via the air supply channel 341a.

Further, the vapor from the sheet 110 is sucked into the exhaust channel 341c from the air intake port 341d and exhausted to a rear end side of the air channel part 341 via the exhaust channel 341c as illustrated by an outline arrow in FIG. 4.

Figure 5:
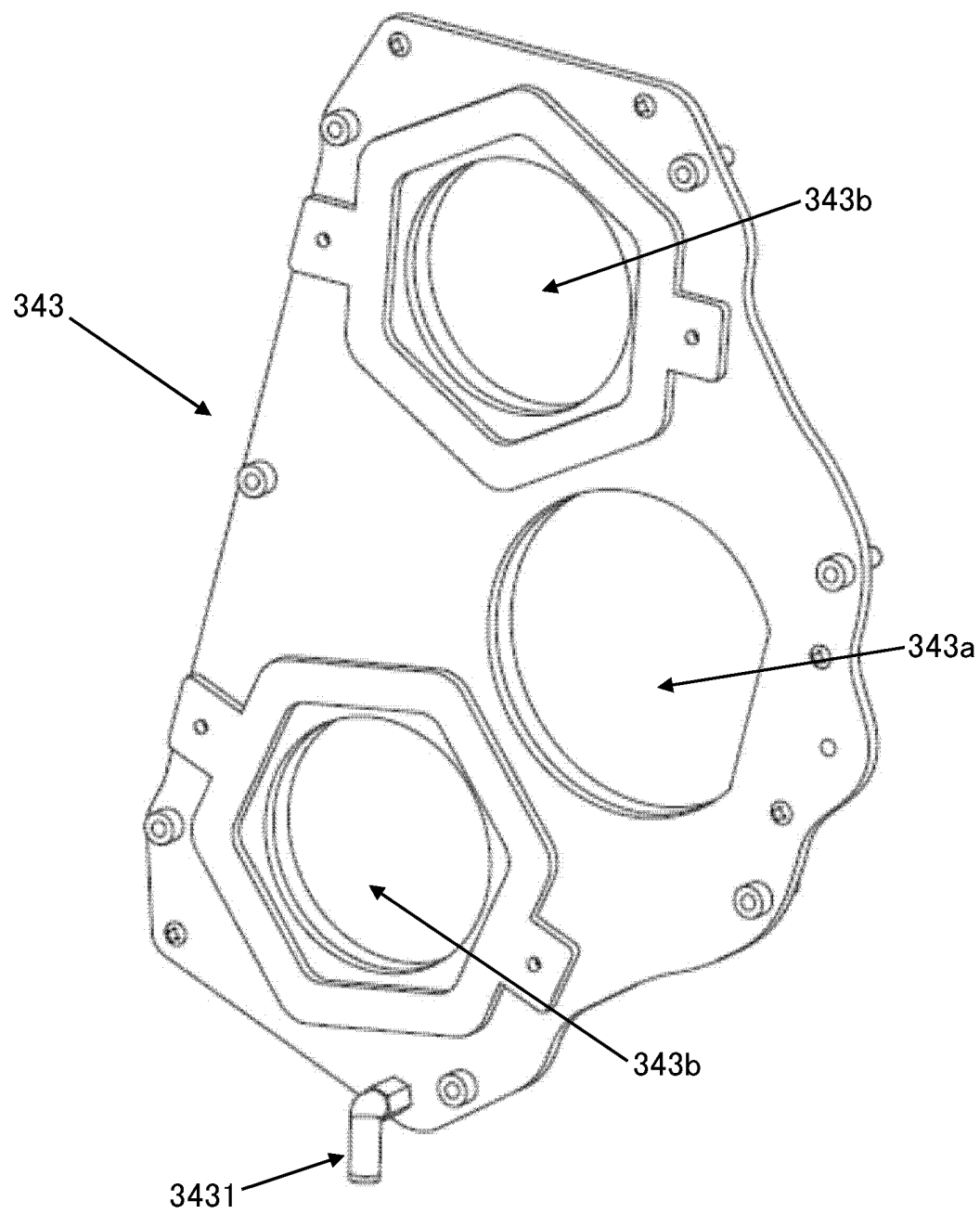
FIG. 5 is a perspective view of an example of a surface of a side plate in the dryer.

Next, the rear side-plate 343 attached to the rear end of the air channel part 341 (rear side-end of the air blower 34) is described with reference to FIG. 5. FIG. 5 is an enlarged perspective view of the rear side-plate 343. As illustrated in FIG. 5, the rear side-plate 343 includes an air supply port 343a and an exhaust port 343b. The air supply port 343a is formed at a position corresponding to an opening at an end of the air supply channel 341a. Further, the exhaust ports 343b are formed at positions corresponding to openings at ends of the exhaust channels 341c, respectively.

The rear side-plate 343 includes a rear side-plate tube joint 3431 in a vicinity of at least one of the exhaust ports 343b. The rear side-plate tube joint 3431 collects the waste liquid generated by condensation occurred inside the air channel part 341 (wall of the exhaust channel 341c). An inner wall of the exhaust channel 341c is slightly slanted downward from a front (lower left in FIG. 4) to a rear (upper right in FIG. 4) of the exhaust channel 341c. Thus, the waste liquid generated by condensation of the vapor on the inner wall of the exhaust channel 341c moves toward the rear side-plate 343 by effect of gravity. The exhaust port 343b and the exhaust channel 341c constitute an exhaust part.

Figure 6:
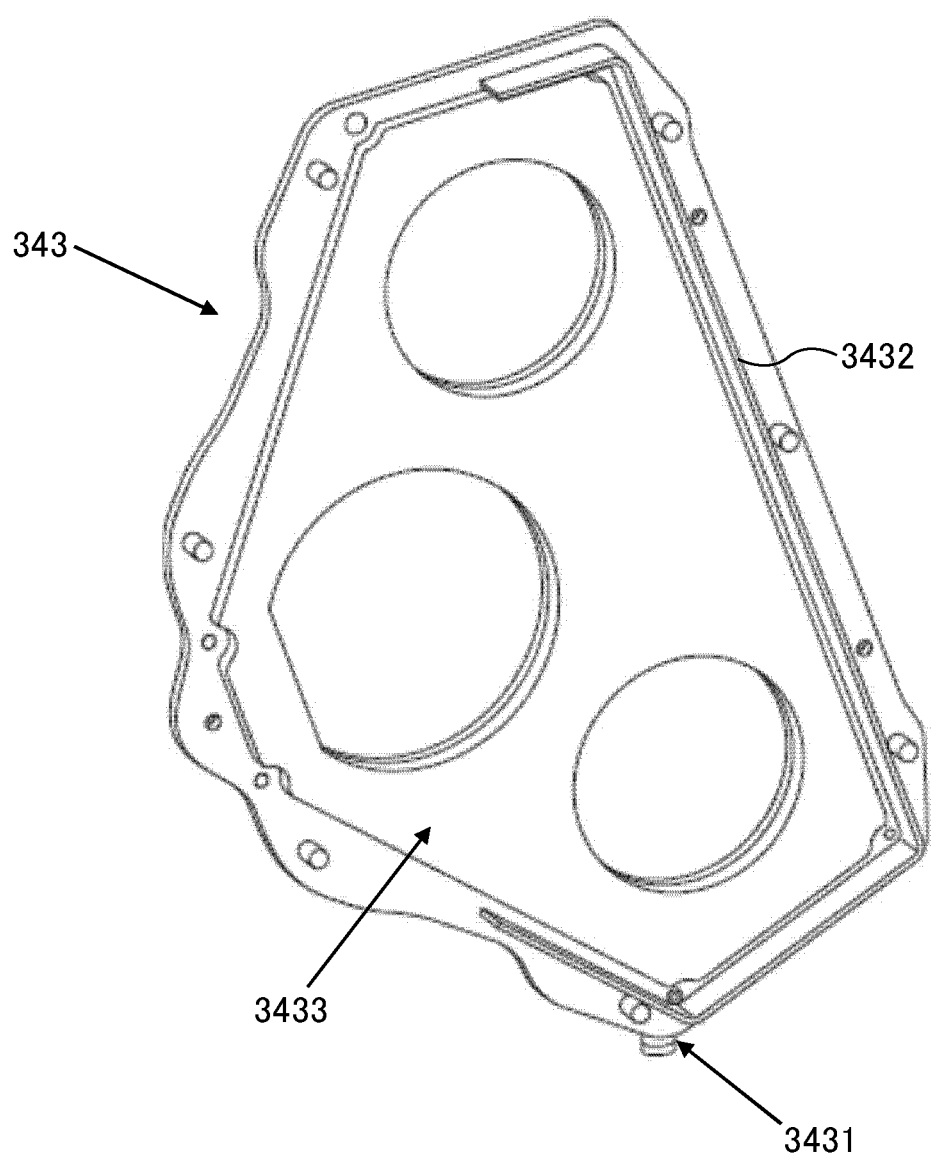
FIG. 6 is a perspective view of an example of a back surface of a side plate in the dryer.

Next, an inner structure of the rear side-plate 343 is described with reference to FIG. 6. FIG. 6 is a perspective view of an inner surface of the rear side-plate 343. As illustrated in FIG. 6, the rear side-plate 343 includes a gasket 3433 attached to an inner surface of the rear side-plate 343. The gasket 3433 is a sealing member to cover a portion of the inner surface of the rear side-plate 343 at which the rear end of the air channel part 341 contacts. The gasket 3433 is a member that prevents intake gas (air) and exhaust gas (air) from leaking from the rear end of the air channel part 341. The gasket 3433 is a material, for example, a sponge material, that is crushed when the air channel part 341 is pressed against the rear side-plate 343 and fills a gap at a contact portion between the air channel part 341 and the rear side-plate 343.

The rear side-plate 343 includes a rear side-plate waste-liquid collection part 3432 on an outer periphery of the gasket 3433 to surround the outer periphery of the gasket 3433. The rear side-plate waste-liquid collection part 3432 is a part of the waste-liquid collection mechanism. The rear side-plate waste-liquid collection part 3432 is formed at a position at which the rear side-plate waste-liquid collection part 3432 contacts the outer wall surface of the rear end of the air channel part 341 when the rear end of the air channel part 341 is pressed against the gasket 3433. The rear side-plate waste-liquid collection part 3432 is, for example, a rib-shaped portion that protrudes from an inner surface of the rear side-plate 343.

An inner wall of the air channel part 341 is slightly slanted downward from a front side (lower left in FIG. 4) to a rear side (upper right in FIG. 4) of the air channel part 341. The downward direction of the inner wall of the air channel part 341 is toward the direction of the rear side-plate 343, that is, the back (rear) side (upper right in FIG. 4) of the air channel part 341. Thus, the waste liquid generated by condensation of the vapor on the inner wall of the air channel part 341 moves along a downward slope and reaches to the gasket 3433 of the rear side-plate 343.

The waste liquid reaching to the gasket 3433 permeates through the gasket 3433 and is collected by the rear side-plate waste-liquid collection part 3432. Vapor contained in the exhaust gas also adheres to the gasket 3433. The vapor collected by the gasket 3433 moves in the direction of gravity while penetrating into the gasket 3433. The rear side-plate waste-liquid collection part 3432 is formed to collect the waste liquid that has permeated and moved through the gasket 3433.

Figure 7:
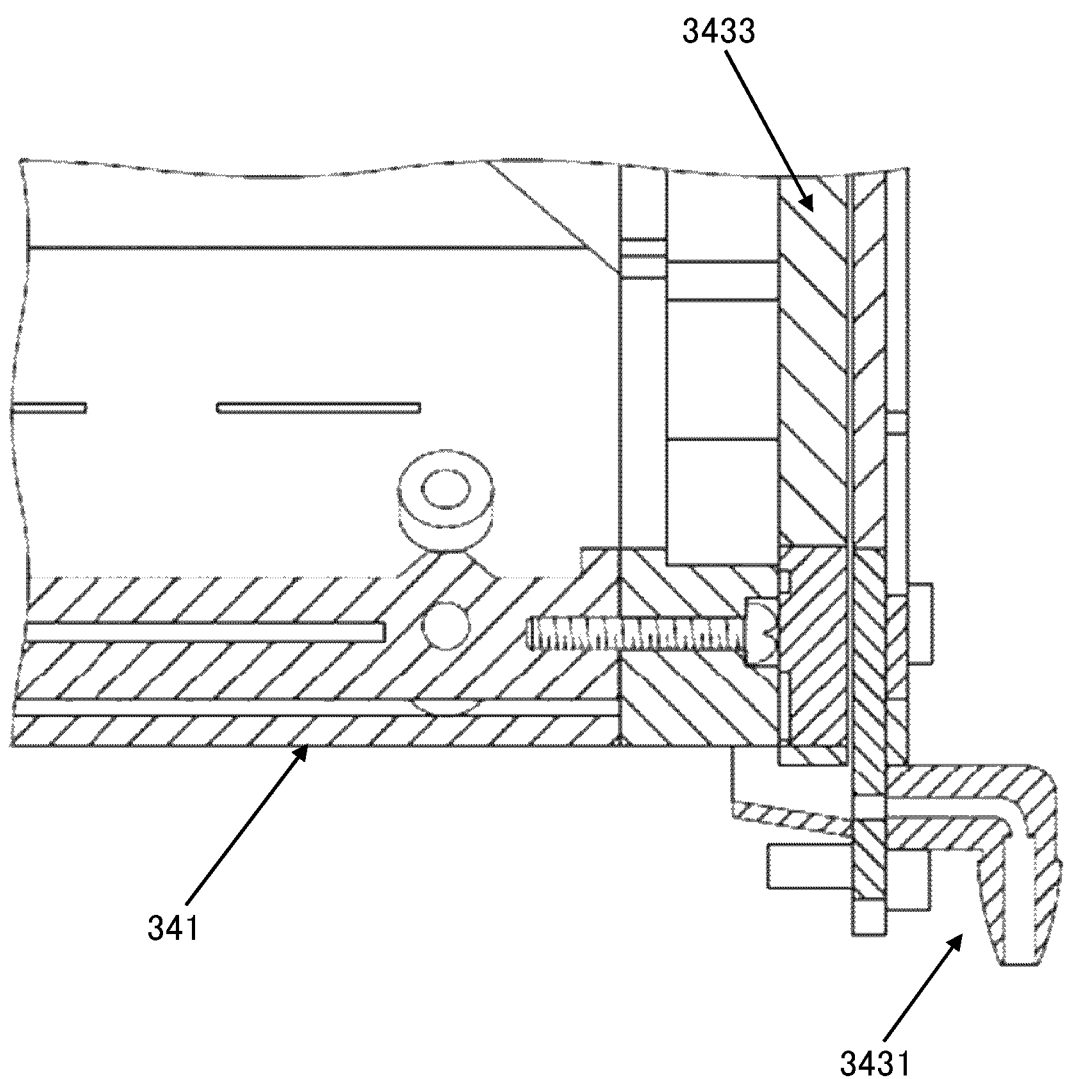
FIG. 7 is a cross-sectional view of an example of a waste-liquid collection port in the dryer.

FIG. 7 is a cross-sectional side view of the rear side-plate tube joint 3431. The rear side-plate tube joint 3431 is a waste-liquid collection port to exhaust the waste liquid collected by the rear side-plate waste-liquid collection part 3432. As illustrated in FIG. 7, the rear side-plate tube joint 3431 is formed at a lower rear end of the air channel part 341 (lower right end in FIG. 7). The rear side-plate tube joint 3431 includes a nozzle port that can discharge, to outside of the air channel part 341, the waste liquid generated by collecting the condensed vapor. Connecting a waste-liquid tube to the rear side-plate tube joint 3431 can exhaust the waste liquid generated from condensed vapor in the air channel part 341 from the rear side-plate tube joint 3431.

[Description of Waste-Liquid Collection Plate 35]

Figure 8:
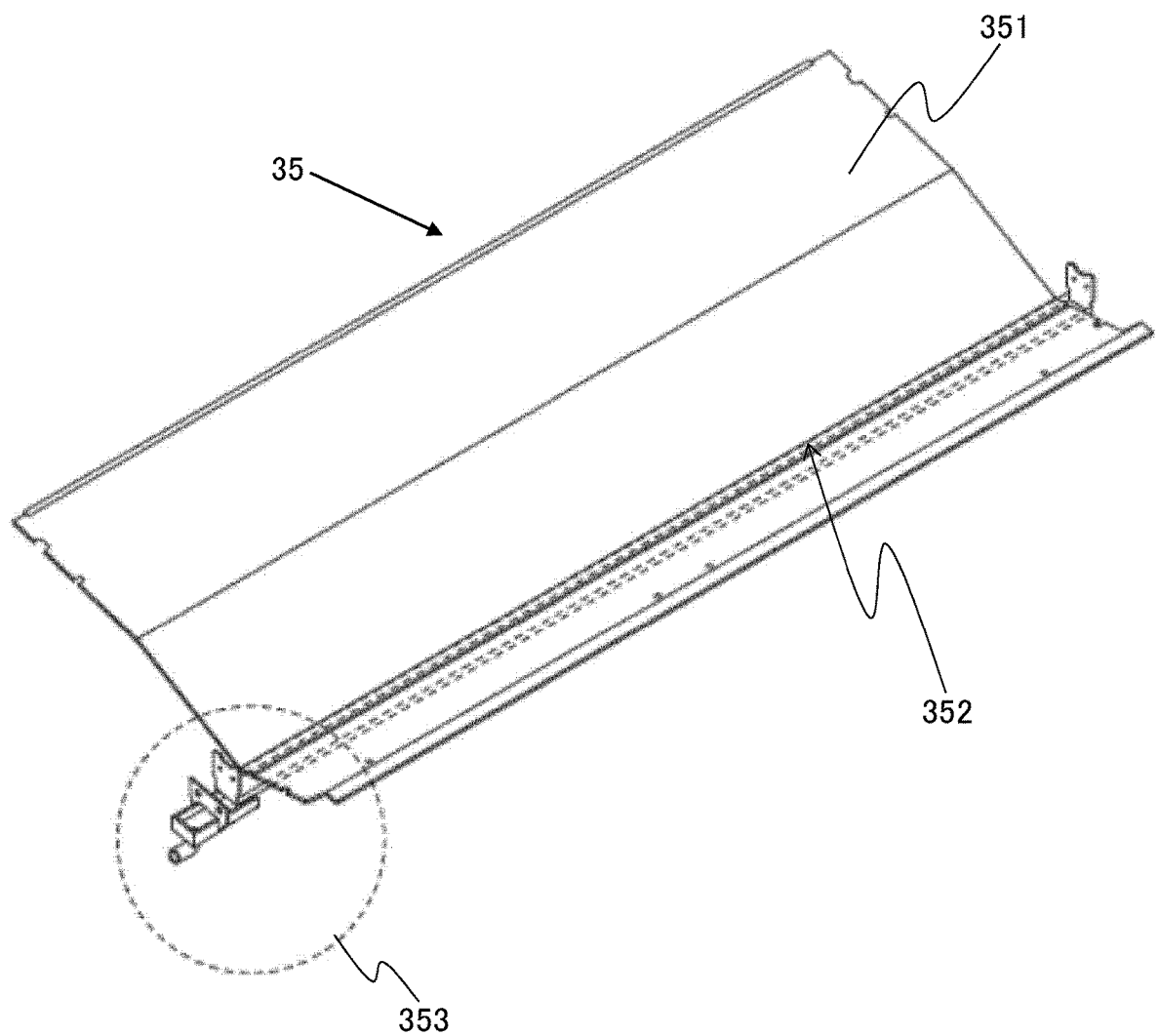
FIG. 8 is a perspective view of an example of a waste-liquid collection plate in the dryer.

Next, a structure of the waste-liquid collection plate 35 is described below. FIG. 8 is an external perspective view of a waste-liquid collection plate 35. The waste-liquid collection plate 35 constitutes a collection device including an inclined part 351, a gutter 352, and a waste-liquid collection plate joint 353. As illustrated in FIG. 2, the plurality of waste-liquid collection plates 35 is arranged around the air blowers 34. The waste-liquid collection plate 35 is a member that constitutes a part of the waste-liquid collection mechanism.

The inclined part 351 is a plate-like member that is disposed at a position to which the waste liquid generated from the condensed vapor on the exterior of the air blower 34 may be collected, liquefied, and dropped. The waste liquid fallen on the inclined part 351 slides down toward the gutter 352 disposed in a valley portion formed in the inclined part 351.

The gutter 352 is a long member having a length approximately the same as a length of the inclined part 351 in a longitudinal direction of the inclined part 351. The gutter 352 is a member that functions to collect the waste liquid moved from the inclined part 351. The gutter 352 has a slight downward slope toward one end. Thus, the waste liquid fallen from the inclined part 351 moves to the one end of the gutter 352. The waste-liquid collection plate joint 353 is attached to the one end of downward slope of the gutter 352. The waste-liquid collection plate joint 353 is one of the member that configures the waste-liquid collection port.

Figure 9:
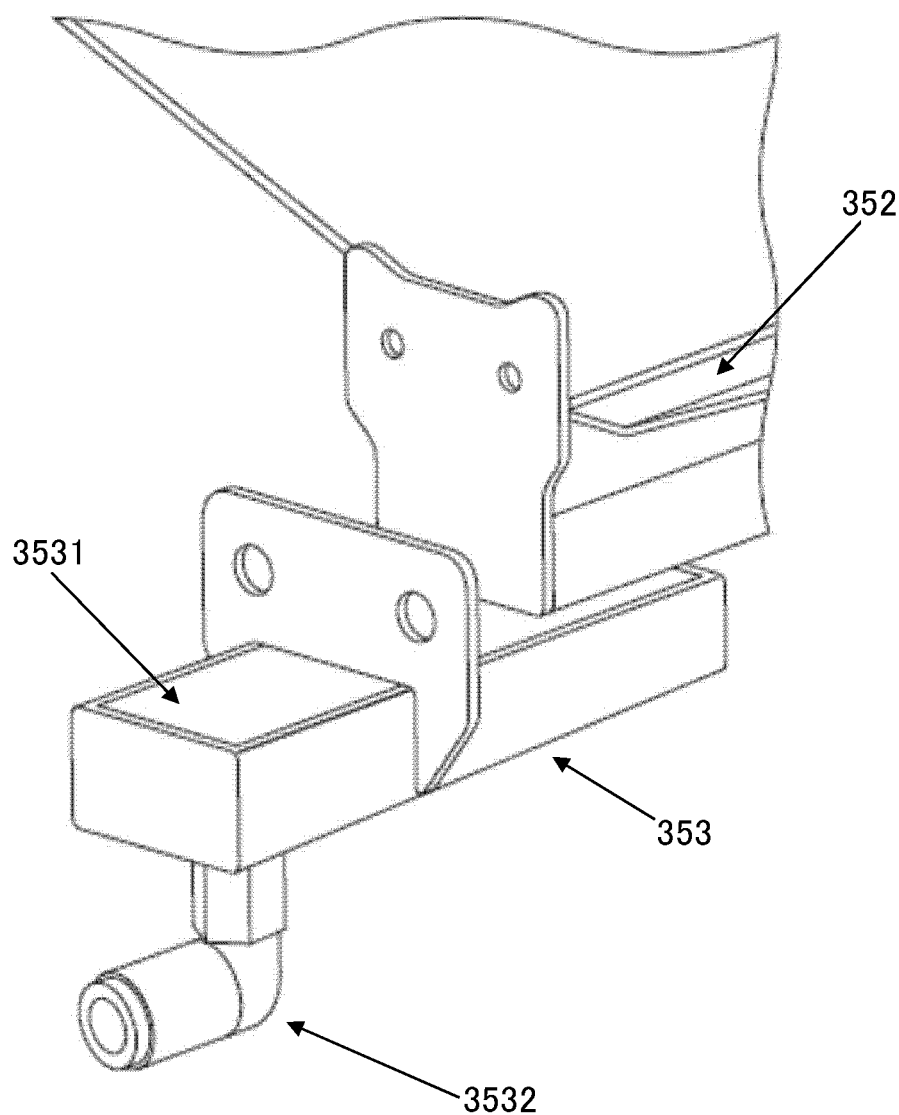
FIG. 9 is an enlarged perspective view of the waste-liquid collection configuration in the waste-liquid collection plate.

FIG. 9 is an enlarged perspective view of the waste-liquid collection plate joint 353 in the waste-liquid collection plate 35. As illustrated in FIG. 9, the waste-liquid collection plate joint 353 includes a pan 3531 and a pan joint 3532. The pan 3531 configures a space in which the waste liquid moved from the gutter 352 is storable. The pan joint 3532 is connected to the pan 3531 and configures a port to discharge the waste liquid. The pan joint 3532 is one of the waste-liquid collection port to which a "tube" is connected. The tube is a drainage tube to feed the waste liquid to a waste liquid tank by a pressure generated by a pump described below.

[Description of Exhaust Duct 362]

Figure 10:
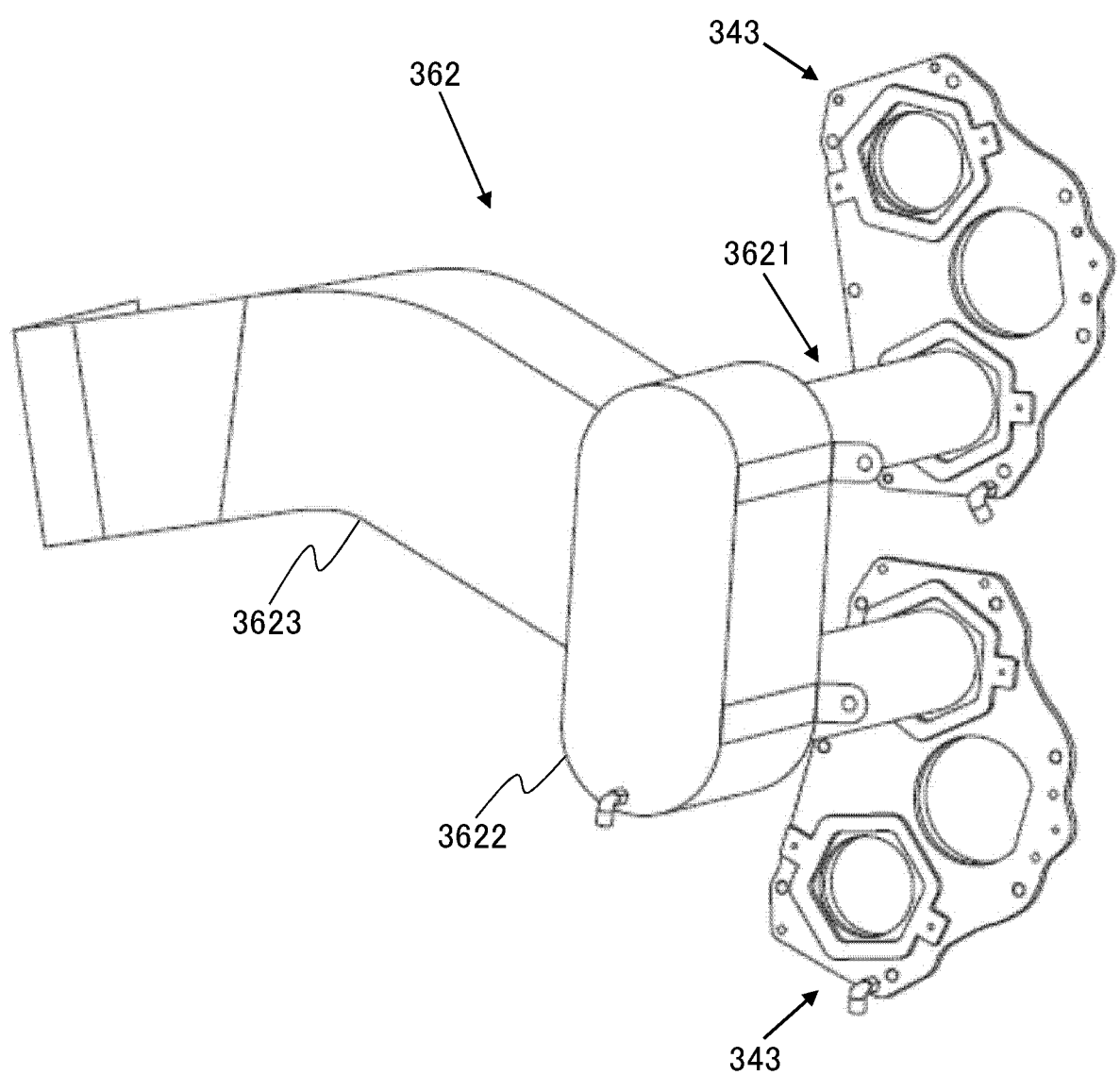
FIG. 10 is a perspective view of an example of an exhaust mechanism in the air blower.

Next, a configuration of an exhaust duct 362 is described below. FIG. 10 is an external perspective view of an exhaust duct 362. The exhaust duct 362 is installed on a back side of the rear side-plate 343. The exhaust duct 362 includes an exhaust tube 3621 that fits into a hole provided in the rear side-plate 343. The exhaust tube 3621 is connected to a collection duct 3623 through a tube-collection member 3622. The air containing the vapor collected by the air blower 34 is exhausted by the collection duct 3623 through each of the exhaust tubes 3621 and the tube-collection member 3622. The exhaust duct 362 constitutes an exhaust device.

Figure 11:
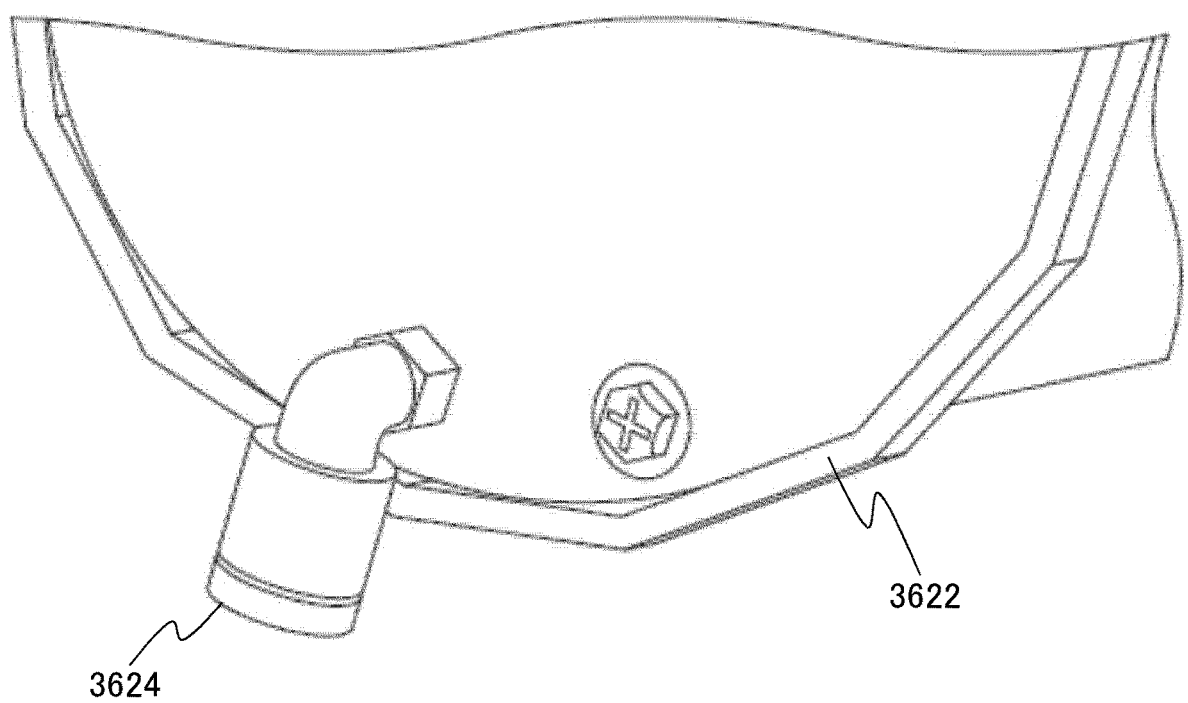
FIG. 11 is a partially enlarged view of an example of a waste-liquid collection configuration in the exhaust mechanism.

FIG. 11 is an enlarged perspective view of a portion of the exterior of a tube-collection member 3622 in the exhaust duct 362. An exhaust waste-liquid collection joint 3624 is attached to the tube-collection member 3622. The exhaust waste-liquid collection joint 3624 is one of the waste-liquid collection ports provided to discharge (drain) the waste liquid generated by the condensation of vapor on the inner wall of the exhaust duct 362 and collected at the end in the gravity direction of the tube-collection member 3622.

As described above, the dryer 30 according to the present embodiment includes a plurality of waste-liquid collection ports. Each of the waste-liquid collection ports is disposed at a position at which the waste liquid can be efficiently collected. The waste liquid is generated by condensation of the vapor generated by heating the sheet 110. More specifically, the waste-liquid collection port 320 is disposed at a position at which the condensation of the vapor is likely to occur and is disposed at a low position such as the pan joint 3532 in FIG. 9. The dryer 30 includes the waste-liquid collection unit 310 as described below as a structure that controls an operation to collect the waste liquid from each of the waste-liquid collection ports to a waste liquid tank.

[Functional Configuration of Dryer 30]

Figure 12:
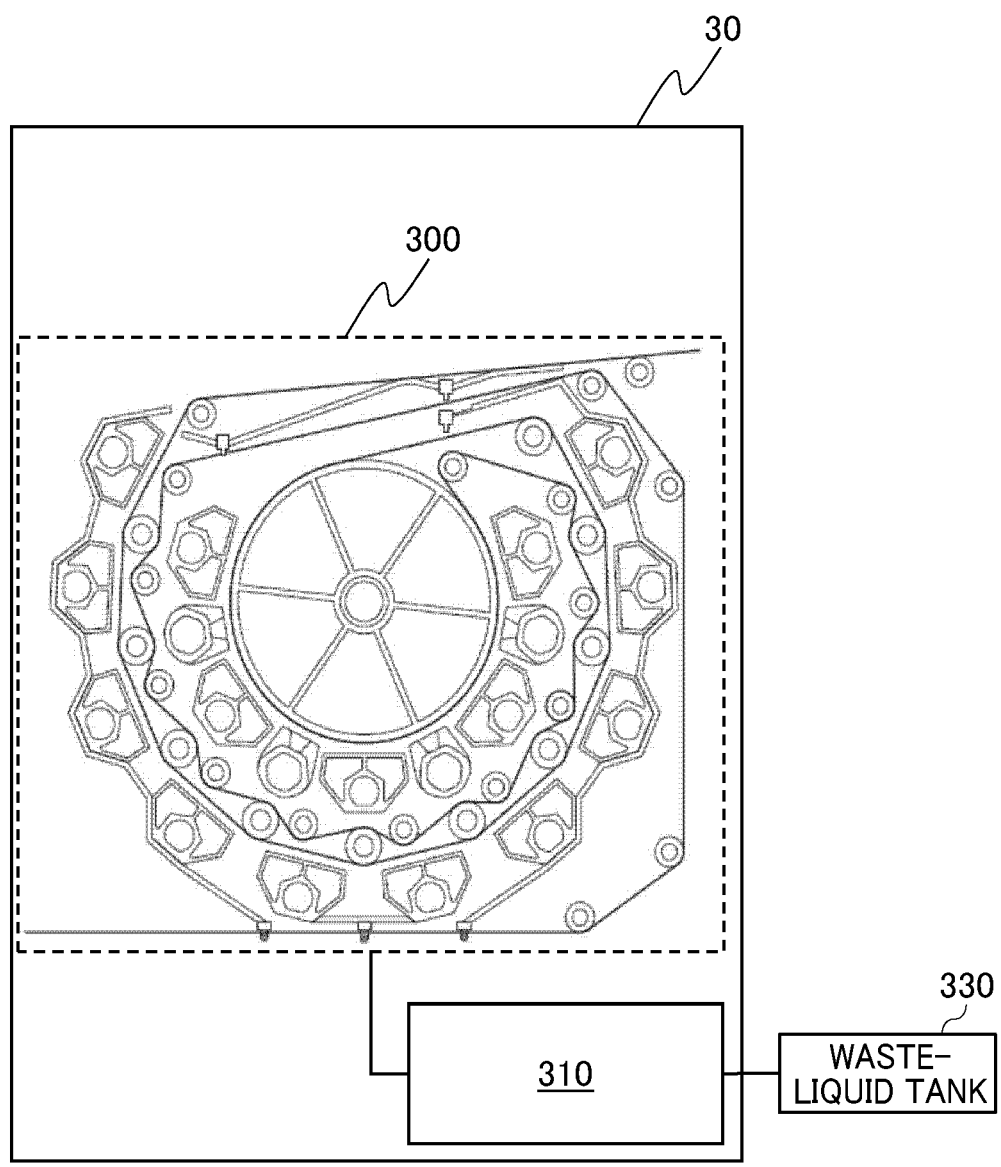
FIG. 12 is a schematic cross-sectional view of an arrangement example of a waste-liquid collection unit in the dryer.

Next, a functional configuration of the dryer 30 according to the present embodiment is described below. As illustrated in FIG. 12, the dryer 30 includes a drying unit 300 and a waste-liquid collection unit 310 that collects the waste liquid generated by condensation of vapor in the drying unit 300. The waste-liquid collection unit 310 is disposed near a bottom of the dryer 30 inside the dryer 30. Thus, the waste liquid generated by condensation of vapor in the dryer 30 is easily collected in the waste liquid tank 330 by the action of gravity.

Figure 13:
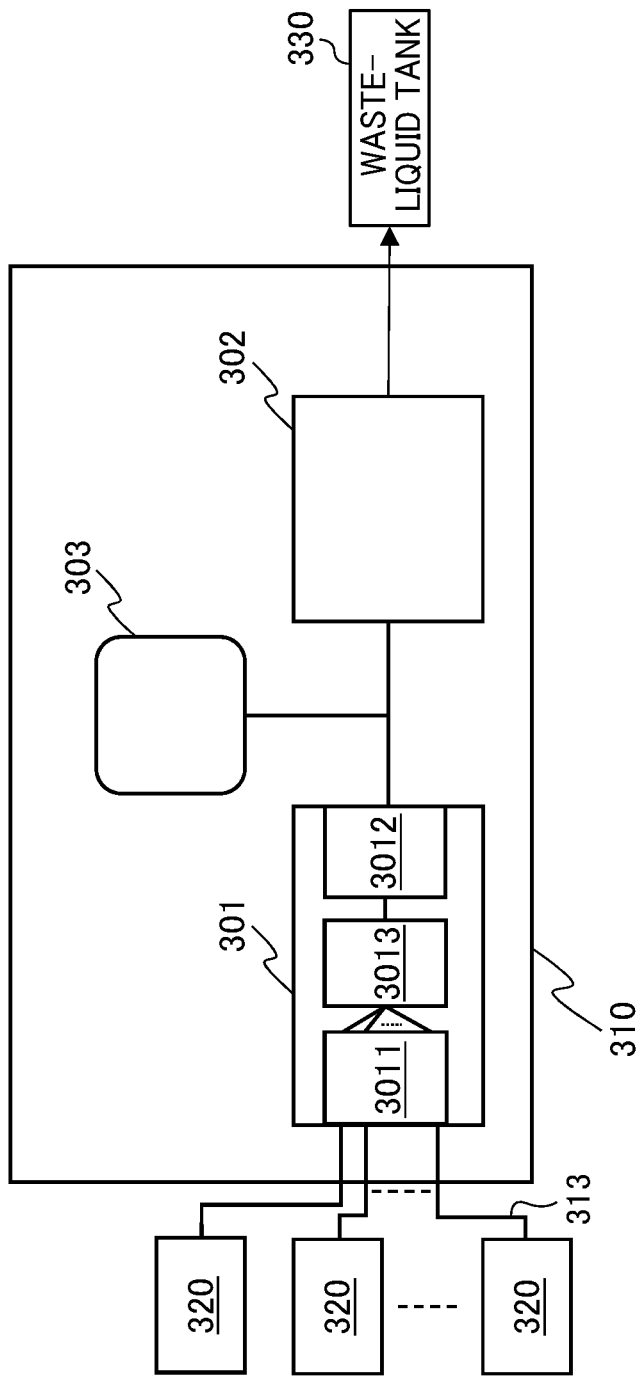
FIG. 13 is a circuit diagram of a functional configuration of a waste-liquid collection unit in the dryer.

FIG. 13 is a schematic view of the waste-liquid collection unit 310 illustrating a detailed configuration of the waste-liquid collection unit 310. The waste-liquid collection unit 310 also functions as a controller that controls a collection operation of the waste liquid from the plurality of waste-liquid collection ports 320 as the waste-liquid collection ports. The waste-liquid collection unit 310 includes a switching valve 301, a waste-liquid pump 302, and a pressure sensor 303. The waste-liquid collection port 320 also constitutes a collection device.

The switching valve 301 is a device including a valve that switches connection between the waste-liquid collection port 320 and the waste-liquid pump 302. The waste-liquid collection port 320 is the waste-liquid collection port such as the pan joint 3532. The switching valve 301 includes a plurality of input units 3011, one output unit 3012, and a switch 3013. The plurality of input units 3011 is connected to the plurality of waste-liquid collection ports 320 and a waste-liquid tube 313. The output unit 3012 is connected to the waste-liquid pump 302.

The waste-liquid tube 313 is an example of a drainage tube to drain the liquid from each of the plurality of collection devices including members such as the waste-liquid collection plate 35 and the waste-liquid collection port 320. The switch 3013 selectively connects the plurality of input units 3011 and the output unit 3012 or switches connection between the plurality of input units 3011 and the output unit 3012. The switching valve 301 constitutes a switching device.

The input unit 3011 includes a connection unit to which the waste-liquid tube 313 is connected and an input valve that enables the waste liquid to flow through the waste-liquid tube 313.

The switch 3013 also controls an opening and closing of the input valve in each of the input units 3011. For example, if there are thirty waste-liquid collection ports 320, there are thirty input units 3011. The switch 3013 switches connection between the input units 3011 and the output unit 3012, and controls to open the input valve of the connected input unit 3011. Further, the switch 3013 operates to close the input valve of the connected input unit 3011 and switches to another input unit 3011 to connect with the output unit 3012 when a predetermined condition is met.

The waste-liquid pump 302 is a pump that is connected to the output unit 3012 of the switching valve 301. The waste-liquid pump 302 causes waste liquid to flow from each of the waste-liquid collection port 320 and pumps the waste liquid to the waste liquid tank 330.

The pressure sensor 303 is a sensor that measures a pressure between the output unit 3012 of the switching valve 301 and the waste-liquid pump 302. The pressure sensor 303 outputs a predetermined signal (pressure-detection result signal) according to the measured pressure. Here, the pressure-detection result signal is a distinguishable signal whether the waste liquid has not been collected (cannot be collected) or the waste liquid has been collected (can be collected) based on a measurement result (measurement pressure) of the pressure sensor 303.

The operations of each of the switching valve 301, the waste-liquid pump 302, and the pressure sensor 303 may be controlled by the controller 200 in the inkjet printer 20. If the controller 200 controls the operations of each of the switching valve 301, the waste-liquid pump 302, and the pressure sensor 303, the switching valve 301, the waste-liquid pump 302, and the pressure sensor 303 are connected to a control signal line or the like as a configuration to receive a control signal from the controller 200. Then, a predetermined operation is performed at a predetermined timing in accordance with a control signal from the controller 200. A pressure-detection result signal from the pressure sensor 303 is output to the controller 200.

Further, the dryer 30 may include a waste-liquid collection controller. If the dryer 30 includes the waste-liquid collection controller, the waste-liquid collection controller may be configured to operate in conjunction with the controller 200 of the inkjet printer 20 to control the operations of the switching valve 301, the waste-liquid pump 302, and the pressure sensor 303.

Figure 17:
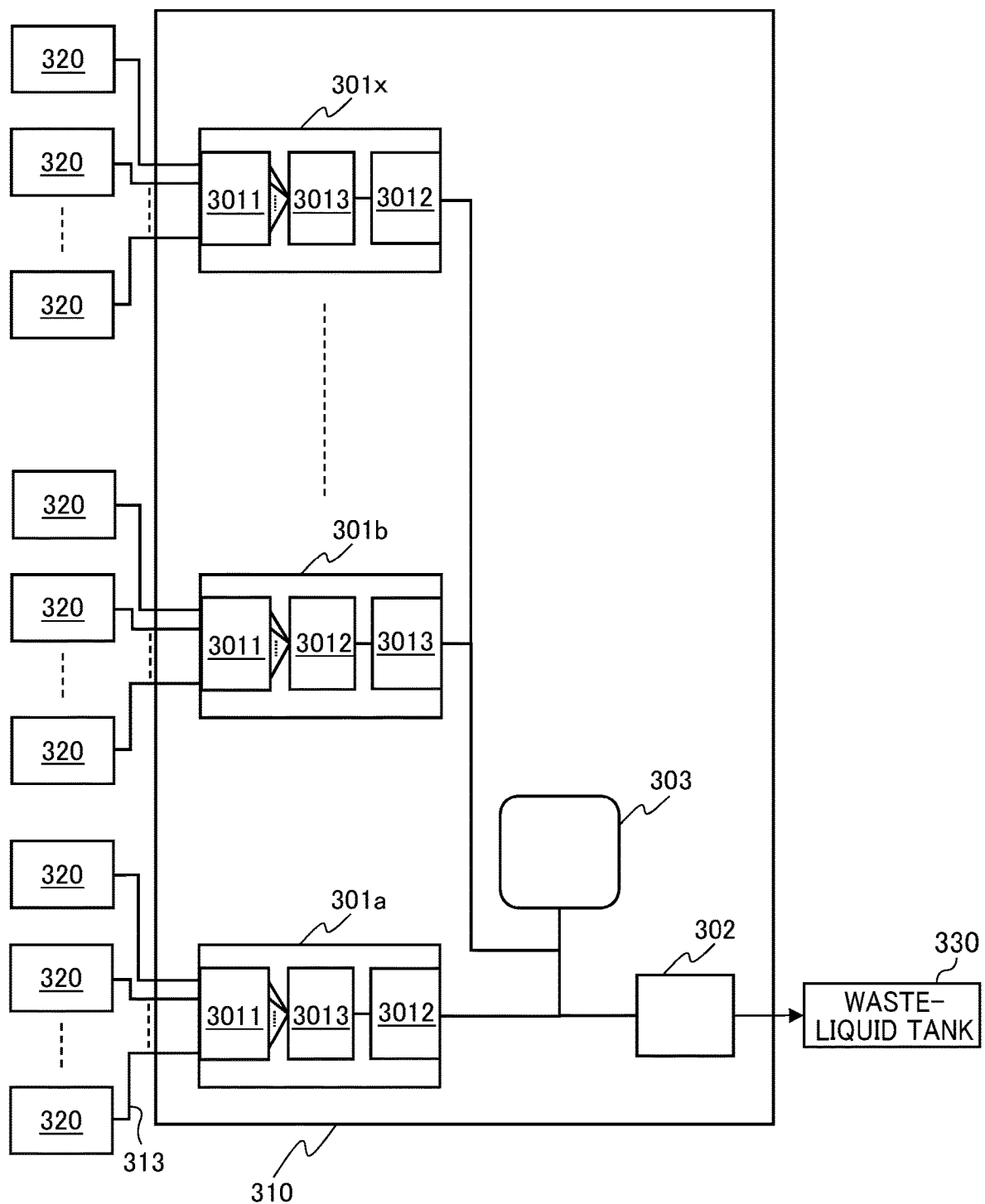
FIG. 17 is a circuit diagram of another example of a functional configuration of a waste-liquid collection unit in the dryer.

As illustrated in FIG. 17, the waste-liquid collection unit 310 may include a plurality of switching valves 301 (301*a* to 301*x*). The waste-liquid collection port 320 is divided into a certain number of groups to form collection position groups for each switching valves 301*a* to 310*x*. In the above-described configuration, one switching valve 301 corresponds to one group of waste-liquid collection port 320 (collection position group) that includes a plurality of waste-liquid collection ports 320. In a control flow as described below, a process for a certain group of waste-liquid collection port 320 may be executed at first. Then, a specific process is executed for the switching valve 301 included in one collection position group as the process target. After completion of the specific process for all the waste-liquid collection ports 320 corresponds to the switching valve 301 of the process target. Then, a collection position group in the next switching valve 301 may be set as a next process target.

Further, the pressure sensor 303 may be individually provided in the waste liquid channel between the switching valve 301 and the waste-liquid collection port 320. Thus, using a control method as described below enable a reliable confirmation of whether the waste liquid can be normally collected between each of the waste-liquid collection ports 320 and the switching valve 301. Therefore, a plurality of pressure sensors 303 may be used in the waste-liquid collection unit 310 according to the present embodiment.

First Example of Control Flow of Dryer 30

Figure 14:
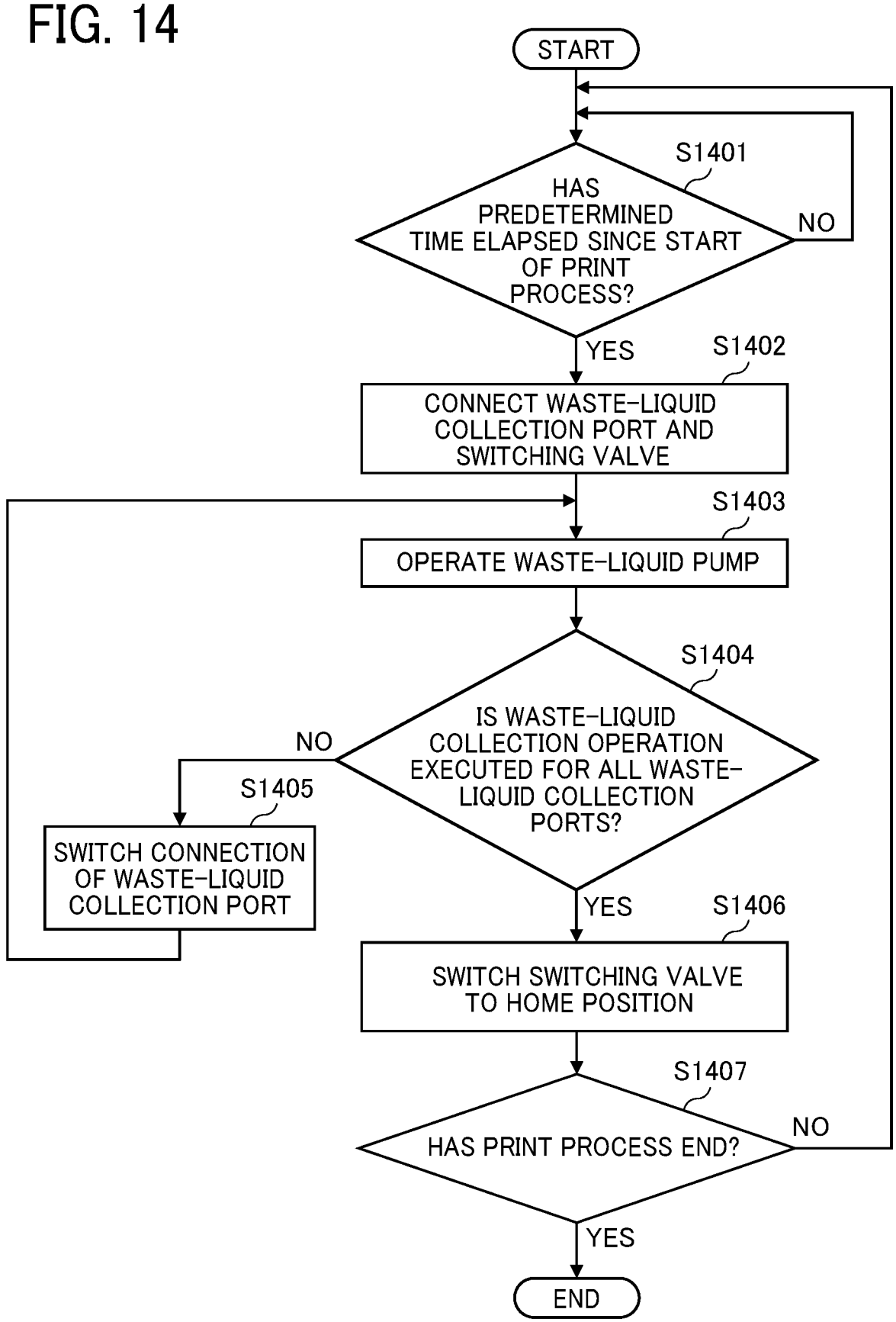
FIG. 14 is a flowchart of an example of a waste-liquid collection operation in the waste-liquid collection unit.

Next, an example of a flow of a waste-liquid collection operation by the waste-liquid collection unit 310 in the dryer 30 is described below with reference to a flowchart of FIG. 14. FIG. 14 is a flowchart of the flow of the waste-liquid collection operation executed when the print process of the inkjet printer 20 is started.

In the following embodiment, the operations of each of the switching valve 301, the waste-liquid pump 302, and the pressure sensor 303 are controlled by the controller 200 in the inkjet printer 20. However, the dryer 30 may include a waste-liquid collection controller to operate in conjunction with the controller 200 of the inkjet printer 20 to control the operations of the switching valve 301, the waste-liquid pump 302, and the pressure sensor 303.

It is monitored whether an elapsed time after a print process has started exceeds a predetermined threshold time, and timing of the waste-liquid collection operation is determined (S1401). Here, the "predetermined threshold time" is, for example, thirty minutes. Therefore, the step S1401 is repeated until thirty minutes have passed since the print process has started (S1401/NO).

The "predetermined threshold time" is a time during which a drying process is performed in the dryer 30, vapor is generated inside the dryer 30, and an amount of the waste liquid generated from the condensed vapor increases to an amount collectable by the waste-liquid collection unit 310. In other words, the "predetermined threshold time" may be set to a time needed for the waste liquid to become an amount desirable to collect before dropping into the dryer 30. Thus, the "predetermined threshold time" may be set appropriately in advance based on an amount of treatment liquid or the amount of liquid ink assumed to be used for the print process.

Alternatively, the predetermined threshold time may be automatically set according to an amount (consumption amount) of the treatment liquid or liquid ink used in the print process. If the predetermined threshold time is automatically set according to the amount of the treatment liquid or liquid ink, the waste-liquid collection unit 310 as a controller of the dryer 30 acquires a unit to set "predetermined threshold time" or information of the consumption amount of the treatment liquid and the liquid ink from the inkjet printer 20. Then, the waste-liquid collection unit 310 calculates and sets the "predetermined threshold time" based on the above-described acquired information.

When the time after the start of the print process exceeds the predetermined threshold time (S1401/YES), first, the controller 200 connects the output unit 3012 and the input unit 3011 connected to one waste-liquid collection port 320 among the plurality of waste-liquid collection ports 320 that is connected to the switching valve 301. Then, the controller 200 opens the corresponding input valve and closes the input valves of other input units 3011 (S1402).

A number of the waste-liquid collection ports 320 in the dryer 30 according to the present embodiment is assumed to be 30, for example. If the number of the waste-liquid collection ports 320 is 30, first, the input unit 3011 and the output unit 3012 corresponding to a first waste-liquid collection port 320 (first waste-liquid collection port 320) are connected, and the input valve in the input unit 3011 is opened. At the time of connection of the input unit 3011 and the output unit 3012 corresponding to the first waste-liquid collection port 320, all the input valves of the input units 3011 corresponding to the second to thirtieth waste-liquid collection ports 320 (second to thirtieth waste-liquid collection ports 320) are closed.

Next, the controller 200 operates the waste-liquid pump 302 for a predetermined time (S1403), and the waste liquid is collected from the waste-liquid collection port 320 (first waste-liquid collection port 320) connected to the input unit 3011 opened. Here, the "predetermined time" for operating the waste-liquid pump 302 is ten seconds. Thus, after the waste-liquid pump 302 is operated for ten seconds, the process proceeds from the step S1403 to the next process.

Next, the controller 200 executes a process to determine whether the waste-liquid collection operation (S1403) is performed for all the waste-liquid collection ports 320 ("is the waste-liquid collection operation executed for all the waste-liquid collection ports?" in S1404). If there is an unexecuted waste-liquid collection port 320 (S1404/NO), the switching valve 301 sequentially switches a connection to connect unexecuted waste-liquid collection port 320 and the switching valve 301. After a switching operation of the switching valve 301 is completed, the process proceeds to S1403 (S1405).

The operations of S1402, S1403, S1404, and S1405 for all the waste-liquid collection ports 320 are repeated. Thus, the waste liquid can be collected from all the waste-liquid collection ports 320. Thus, after the waste-liquid collection operation is executed for all the waste-liquid collection ports 320 (S1404/YES), the switching valve 301 is switched to the home position (S1406). The home position of the switching valve 301 is a state in which the input valves of all the input units 3011 are closed and the waste-liquid collection operation is not executed.

Then, the process returns to S1401 until the print process is completed (S1407/NO). When the print process is finished (S1407/YES), the waste-liquid collection process is also finished. Accordingly, the process is executed every time the "predetermined threshold time" (thirty minutes) elapses during an execution of the print process.

As described above, according to the waste-liquid collection process in the dryer 30 according to the present embodiment, the waste liquid can be periodically collected during an execution of the print process. Thus, the dryer 30 can prevent the waste liquid from overflowing into the dryer 30 that causes malfunction of the dryer 30.

Further, the elapsed time after the start of the print process is monitored in the above-described example of the flow of the waste-liquid collection operation by the waste-liquid collection unit 310 according to the present embodiment in S1401. The waste-liquid collection operation is started from a time point (start point) at which the elapsed time exceeds the "predetermined threshold time". The start point of the waste-liquid collection operation according to the present embodiment is not limited to the elapsed time of the print process.

For example, an occurrence of generation of the condensed vapor increases when the temperature inside the dryer 30 is lowered to some extent after finishing of the print process. Thus, the amount of waste liquid generated from the condensed vapor may increase. In the above-described case, the controller 200 may execute the waste-liquid collection operation according to the present embodiment when the dryer 30 is operable or when a certain period of time has elapsed since generation of the waste liquid in the dryer 30. For example, the elapsed time after the end of the print process is monitored, and the waste-liquid collection operation may be executed when the elapsed time exceeds a specific time.

Second Example of Control Flow of Dryer 30

Figure 15:
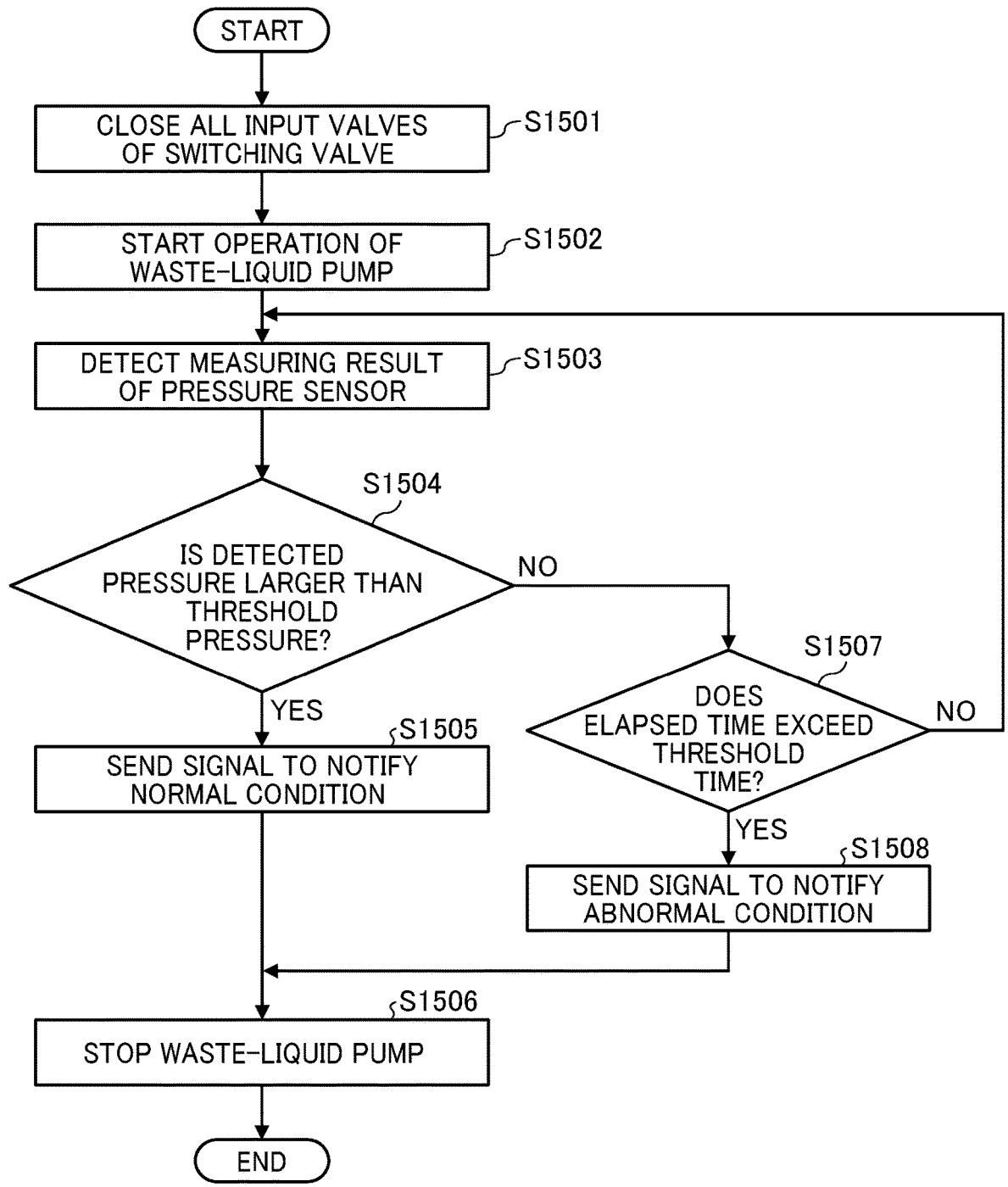
FIG. 15 is a flowchart of another example of a waste-liquid collection operation in the waste-liquid collection unit.

Next, another example of the flow of the waste-liquid collection operation by the waste-liquid collection unit 310 in the dryer 30 is described below with reference to the flowchart of FIG. 15. FIG. 15 is a flowchart of a flow of an initial leak-check operation that is executed before starting the image forming operation in the inkjet printer 20.

First, the switching valve 301 closes the input valves of all the input units 3011 (S1501). Thus, the switching valve 301 blocks the waste liquid from flowing into the waste-liquid pump 302. Next, the controller 200 starts an operation of the waste-liquid pump 302 (S1502). Next, the controller 200 detects the measurement result of the pressure sensor 303 (S1503). If detected measurement result of the pressure (detected pressure) exceeds the predetermined (preset) threshold pressure (S1504/YES), the controller 200 can determine that there is no liquid leakage or clogging in the waste liquid channel. Thus, the pressure sensor 303 transmits a pressure-detection result signal to notify normal condition (S1505). Then, the controller 200 stops the waste-liquid pump 302 (S1506).

Thus, the pressure sensor transmits a signal (pressure-detection result signal) to distinguish between a collected state and an uncollected state. The liquid is collected through the plurality of collection devices in the collected state, and the liquid is not collected through the plurality of collection devices in the uncollected state. The collection devices includes members such as the waste-liquid collection plate 35 and the waste-liquid collection port 320.

Here, the threshold pressure is, for example, "minus 10 kPa". Thus, if the measurement result of the pressure sensor 303 is lower than minus 10 kPa, the controller 200 can determine that the waste-liquid channel between the switching valve 301 and the waste-liquid pump 302 is normal.

If the measurement result (detected pressure) does not exceed the threshold pressure in the step S1504 (S1504/NO), the controller 200 determines whether elapsed time since start of the operation of the waste-liquid pump 302 exceeds a preset threshold time (S1508). If the elapsed time exceeds the threshold time (S1507/NO), the process returns to S1503.

If the elapsed time exceeds the threshold time (S1507/YES), the controller 200 determines that some abnormality such as liquid leakage or clogging in the waste-liquid channel has occurred. If the elapsed time exceeds the threshold time, the pressure sensor 303 does not transmits a pressure-detection result signal to notify that the waste-liquid channel is normal. Thus, the pressure sensor 303 transmits a pressure-detection result signal (abnormality notification signal) that notifies abnormal condition in the dryer 30 (S1508). Then, the controller 200 stops the waste-liquid pump 302 (S1506).

Thus, the pressure sensor 303 transmits an abnormal notification signal to notify abnormality in the dryer 30 when the pressure detected (measured) by the pressure sensor 303 does not exceed the predetermined threshold pressure during operation of the waste-liquid pump 302 while closing the drainage tube (waste-liquid tube 313) by the plurality of switches 3013 (switching valves 301).

According to an initial leak-checking process in the dryer 30 according to the present embodiment as described above, the controller 200 can reliably check whether the operation of the waste-liquid collection mechanism is normal before executing the image forming process. Thus, the dryer 30 can stably operates.

Third Example of Control Flow of Dryer 30

Figure 16:
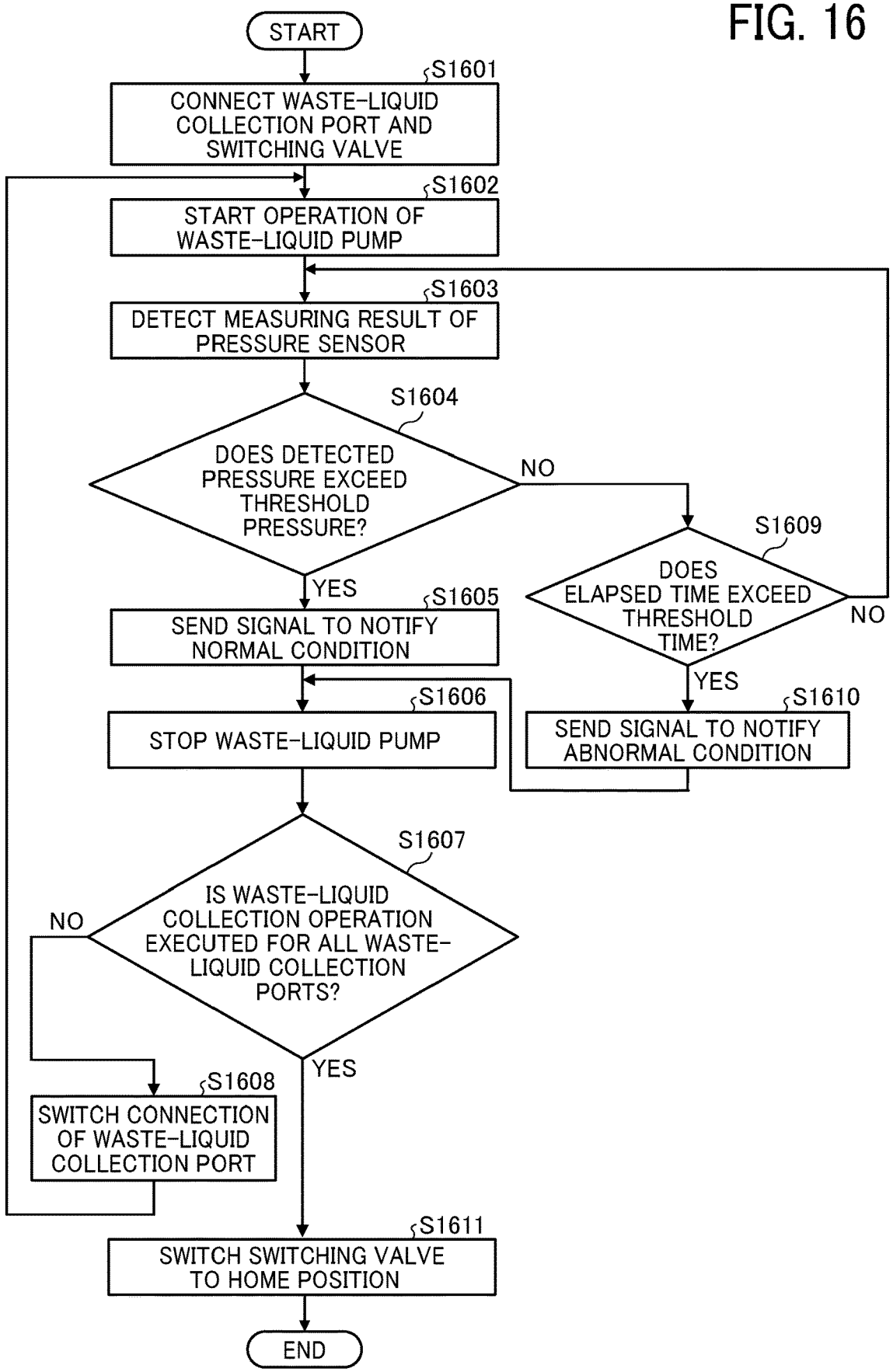
FIG. 16 is a flowchart of still another example of a waste-liquid collection operation in the waste-liquid collection unit.

Next, still another example of the flow of the waste-liquid collection operation by the waste-liquid collection unit 310 in the dryer 30 is described below with reference to the flowchart of FIG. 16. FIG. 16 is a flowchart of a flow of a process operation during maintenance of the waste-liquid collection mechanism.

A maintenance operation is executed when the user operates an operation panel in the dryer 30 or in the inkjet printer 20.

When the maintenance operation is started, first, the switch 3013 connects the output unit 3012 and the input unit 3011 connected to one of the waste-liquid collection port 320 among the plurality of waste-liquid collection ports 320 connected to the switching valve 301. Then, the controller 200 opens the corresponding one of the input valve and closes other input units 3011 (S1601). Here, first, the controller 200 connects the output unit 3012 and the input unit 3011 corresponding to the first waste-liquid collection port 320 to open the corresponding input valve, and closes the other input valves.

Next, the controller 200 starts operation of the waste-liquid pump 302 (S1602). Then, the controller 200 detects the measurement result of the pressure sensor 303 (S1603). For example, the pressure sensor 303 measures a pressure between the switches 3013 and the waste-liquid pump 302. If detected measurement result of the pressure (detected pressure) exceeds the preset threshold pressure (S1604/YES), the controller 200 can determine that the waste-liquid collection operation can be normally executed for the waste-liquid collection port 320 corresponding to the input unit 3011 connected to the switching valve 301. Then, the pressure sensor 303 transmits a pressure-detection result signal notifying that the waste-liquid collection operation can be normally executed (S1605). Then, the controller 200 stops the waste-liquid pump 302 (S1606).

Next, the controller 200 determines whether the waste-liquid collection operation is executed for all the waste-liquid collection ports 320 ("is the waste-liquid collection operation executed for all the waste-liquid collection ports?" in S1607). If there is the waste-liquid collection ports 320 to which the waste-liquid collection operation is not executed (S1607/NO), the switching valve 301 switches the connection to an unexecuted waste-liquid collection port 320. After the switching valve 301 finishes a switching operation, the process proceeds to S1602 (S1608).

If the measurement result (detected pressure) does not exceed the threshold pressure in the step S1604 (S1604/NO), the controller 200 determines whether elapsed time since start of the operation of the waste-liquid pump 302 exceeds a preset threshold time (S1609). If the elapsed time does not exceed the threshold time (S1609/NO), the process returns to S1603.

If the elapsed time exceeds the threshold time (S1609/YES), the controller 200 can determine that the waste-liquid collection operation in the waste-liquid collection port 320 corresponding to the input unit 3011 connected to the switching valve 301 is in an abnormal condition. Then, the pressure sensor 303 transmits a pressure-detection result signal notifying that the waste-liquid collection operation is in the abnormal condition (S1610). Then, the controller 200 stops the waste-liquid pump 302 (S1606).

The above-described process is repeated until the above-described process is executed for all the waste-liquid collection ports 320. If the above-described process is executed for all the waste-liquid collection ports 320 (S1607/YES), the switching valve 301 switches to the home position (S1611), and the maintenance operation is end.

As described above, according to the maintenance process in the dryer 30 according to the present embodiment, it is possible to reliably check whether the state of the waste-liquid collection mechanism in the dryer 30 is normal. Thus, the dryer 30 can stably operates.

The above-described embodiments describes examples in which the object to be dried or the object to be printed is the continuous sheet. However, the object to be dried or the object to be printed (printing object) may be a recording medium (printing object), such as wallpaper or an electronic circuit board sheet (e.g., prepreg) in addition to a continuous material, such as a continuous sheet, a roll sheet, and a web, and a recording medium (a printing object) such as an elongated sheet material.

The printer may print recording images such as characters and figures with a liquid such as ink on a printing object. Further, the printer may print an arbitrary image such as a pattern on the printing object with a liquid such as ink for purposes such as decoration.

Herein, the liquid to be applied is not particularly limited, but it is preferable that the liquid has a viscosity of less than or equal to 30 mPa·s under a normal temperature and a normal pressure or by being heated or cooled.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

When a liquid discharge head is used as the liquid application unit, examples of an energy generation source to discharge a liquid include an energy generation source using a piezoelectric actuator (a lamination piezoelectric element and a thin-film piezoelectric element), a thermal actuator using an electrothermal transducer element such as a heating resistor, a static actuator including a diaphragm plate and opposed electrodes, and the like.

The terms "printing" in the present embodiment may be used synonymously with the terms of "image formation", "recording", "printing", and "image printing".

Embodiment of Layer Forming Apparatus

The dryer according to an embodiment of the present disclosure is applicable to a layer forming apparatus.

Figure 18:
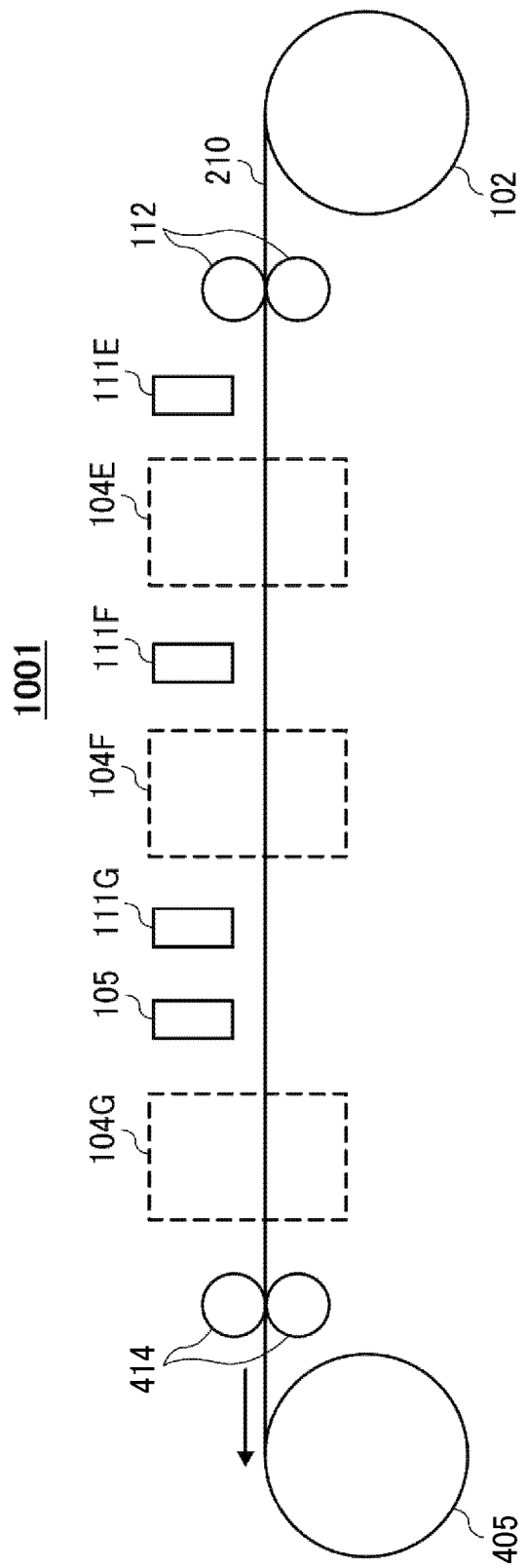
FIG. 18 is a schematic side view of an embodiment of a layer forming apparatus to which the dryer according to an embodiment of the present disclosure is applicable.

FIG. 18 is a schematic side view of a layer forming apparatus using the dryer 30 in FIG. 2. In general, "drying" refers to removing moisture from the object, but in the present embodiment, "drying" includes vaporizing a liquid that is not limited to moisture. An electrode printing apparatus 1001 is an example of a layer forming apparatus. The electrode printing apparatus 1001 includes a root winding roller 102, a conveyance roller 112, an ejection roller 414, and a winding roller 405 as similarly in the print system 1 of FIG. 1. The electrode printing apparatus 1001 feeds an electrode substrate 210 from the root winding roller 102.

The electrode printing apparatus 1001 includes a first liquid discharge head 111E, a first dryer 104E, a second liquid discharge head 111F, a second dryer 104F, a third liquid discharge head 111G, a light source 105, and a third dryer 104G. The first liquid discharge head 111E, the first dryer 104E, the second liquid discharge head 111F, the second dryer 104F, the third liquid discharge head 111G, the light source 105, and the third dryer 104G are disposed between the conveyance roller 112 and the ejection roller 414 in an order from upstream to downstream in the conveyance direction of the electrode substrate 210. The first liquid discharge head 111E, the second liquid discharge head 111F, and the third liquid discharge head 111G are examples of a liquid application unit.

The first liquid discharge head 111E functions as a liquid discharge head to prepare an active material layer. The first liquid discharge head 111E discharges an active-material layer preparation ink that contains active material onto a surface of the electrode substrate 210 to form (prepare) the active material layer on the surface of the electrode substrate 210.

The first dryer 104E dries the electrode substrate 210 onto which the active-material layer preparation ink is applied by the first liquid discharge head 111E as an object to be dried.

The second liquid discharge head 111F functions as a liquid discharge head to form an ink layer. The second liquid discharge head 111F discharges a liquid ink that is an inorganic layer preparation ink onto the electrode substrate 210 to form an ink layer on the electrode substrate 210.

The second dryer 104F dries the electrode substrate 210 onto which the inorganic-layer preparation ink is applied on the active material layer by the second liquid discharge head 111F as an object to be dried.

The third liquid discharge head 111G functions as a liquid discharge head for forming an ink layer. The third liquid discharge head 111G discharges a liquid ink that is a resin layer preparation ink onto the electrode substrate 210 to form the ink layer.

The light source 105 has a curing function that irradiates the ink layer formed on the electrode substrate 210 with light such as ultraviolet rays to cure the ink layer into a resin layer.

The third dryer 104G dries the electrode substrate 210 as an object to be dried onto which the resin layer preparation ink is applied and irradiated with light. The resin layer preparation ink is applied onto the active material layer and the inorganic layer on the electrode substrate 210 by the third liquid discharge head 111G. Further, the light source 105 irradiates the resin layer preparation ink with the light.

Thus, the third dryer 104G dries the resin layer preparation ink applied by the third liquid discharge head 111G and irradiated with light by the light source 105.

The third dryer 104G also has a curing acceleration function to accelerate curing of the ink layer into the resin layer. The third dryer 104G heats the ink layer formed by the resin layer preparation ink applied by the third liquid discharge head 111G to accelerate curing.

The first dryer 104E, the second dryer 104F, and the third dryer 104G have the same configuration as the configuration of the dryer 30 as illustrated in FIG. 2. Since the first dryer 104E, the second dryer 104F, and the third dryer 104G are used in a layer forming apparatus to form a plurality of layers on the electrode substrate 210, a curvature of a conveyance path to convey the electrode substrate 210 is preferably as small as possible.

Figure 19:
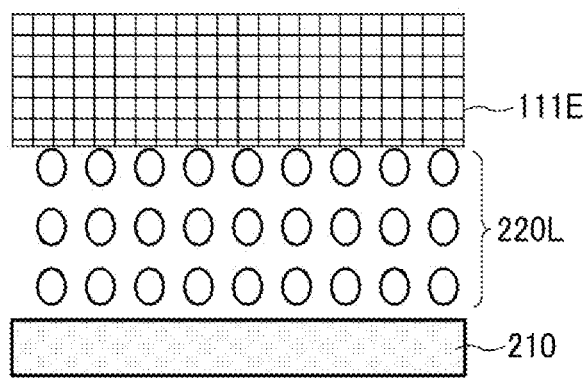
FIG. 19 is a schematic cross-sectional view of a part of a layer forming process performed by the layer forming apparatus according to an embodiment of the present disclosure.
Figure 20:
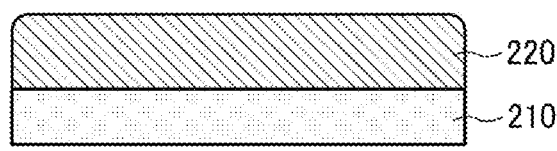
FIG. 20 is a schematic cross-sectional view of a next part of the layer forming process.
Figure 21:
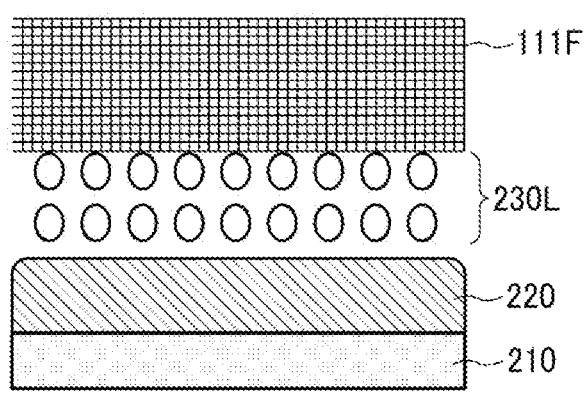
FIG. 21 is a schematic cross-sectional view of a further next part of the layer forming process.
Figure 22:
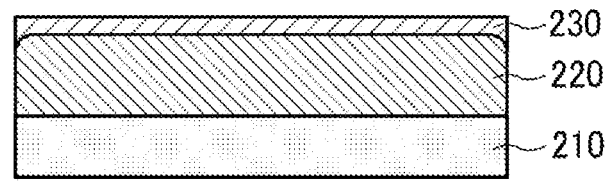
FIG. 22 is a schematic cross-sectional view of a further next part of the layer forming process.
Figure 23:
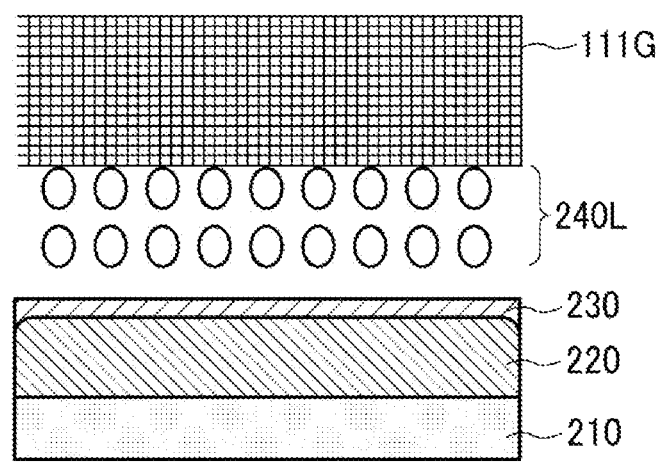
FIG. 23 is a schematic cross-sectional view of a further next part of the layer forming process.
Figure 24:
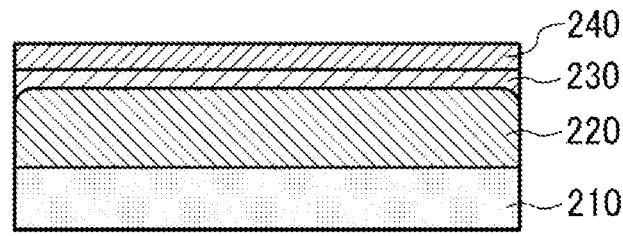
FIG. 24 is a schematic cross-sectional view of a further next part of the layer forming process.

FIGS. 19 to 21 are schematic cross-sectional views of layers formed by a layer forming process of the layer forming apparatus illustrated in FIG. 18. FIGS. 22 to 24 are schematic cross-sectional views of layers formed by a layer forming process of the layer forming apparatus continued from FIG. 21.

As illustrated in FIG. 19, the first liquid discharge head 111E discharges the active-material layer preparation ink 220L containing the active material onto the surface of the electrode substrate 210.

As illustrated in FIG. 20, the first dryer 104E dries the electrode substrate 210 including the active material layer 220 formed by the active-material layer preparation ink 220L as an object to be dried.

The second liquid discharge head 111F discharges the inorganic layer forming ink 230L onto the surface of the active material layer 220 on the electrode substrate 210 as illustrated in FIG. 21.

Further, as illustrated in FIG. 22, the second dryer 104F dries the electrode substrate 210 including the inorganic layer 230 formed of the inorganic layer forming ink 230L and the active material layer 220 as an object to be dried.

As illustrated in FIG. 23, the third liquid discharge head 111G discharges the resin layer preparation ink 240L onto the surface of the inorganic layer 230 on the electrode substrate 210 and the active material layer 220.

As illustrated in FIG. 24, the light source 105 irradiates and cures the resin layer 240 with light. The resin layer 240 is formed of the resin layer preparation ink 240L.

As illustrated in FIG. 24, the third dryer 104G heats the resin layer 240 formed of the resin layer preparation ink 240L to accelerate curing of the resin layer 240.

Further, as illustrated in FIG. 24, the third dryer 104G dries the electrode substrate 210 including the resin layer 240 formed of the resin layer preparation ink 240L, the inorganic layer 230, and the active material layer 220 as an object to be dried.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

For example, the controller 200 and the waste-liquid collection controller as described above may be implemented by the processing circuitry.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A dryer comprising:
   a heater configured to heat an object to dry the object;
   a plurality of collection devices configured to collect a liquid generated by liquefication of condensed vapor in the dryer;
   a drainage tube configured to drain the liquid from each of the plurality of collection devices;
   a pump configured to feed the liquid through the drainage tube;
   a switch configured to switch a connection between the plurality of collection devices and the switch; and
   a pressure sensor configured to measure a pressure between the switch and the pump.

2. The dryer according to claim 1,
   wherein the pressure sensor measures a pressure inside the drainage tube connecting the switch and the pump.

3. The dryer according to claim 2,
   wherein the pressure sensor transmits a signal to distinguish between a collected state and an uncollected state,
   wherein the liquid is collected through the plurality of collection devices in the collected state, and
   the liquid is not collected through the plurality of collection devices in the uncollected state.

4. The dryer according to claim 3,
   wherein the pressure sensor transmits the signal when the pressure measured by the pressure sensor exceeds a threshold pressure.

5. The dryer according to claim 4,
   wherein the switch switches the connection between the plurality of collection devices and the pump when the signal from the pressure sensor indicates the uncollected state.

6. The dryer according to claim 4, further comprising:
   a plurality of switches including the switch; and
   a plurality of collection position groups each including the plurality of collection devices,
   wherein each of the plurality of switches is connected to corresponding one of the plurality of collection position groups.

7. The dryer according to claim 6,
   wherein the pressure sensor transmits an abnormal notification signal to notify abnormality in the dryer when the pressure measured by the pressure sensor does not exceed the threshold pressure during operation of the pump while closing the drainage tube by the plurality of switches.

8. A printer comprising:
a liquid application unit configured to apply a liquid onto the object; and
the dryer according to claim 1 configured to dry the object on which the liquid is applied by the liquid application unit.

* * * * *